US012657964B2

(12) United States Patent
Galley et al.

(10) Patent No.: US 12,657,964 B2
(45) Date of Patent: Jun. 16, 2026

(54) HANDLING OF MAIL ITEMS

(71) Applicant: Stamp Free Limited, Edinburgh (GB)

(72) Inventors: Chris Galley, Maidenhead (GB); Hugh Craigie Halkett, Newbridge (GB); Tim Higginbotham, Sandy (GB)

(73) Assignee: Stamp Free Limited, Edinburgh (GB)

( * ) Notice: Subject to any disclaimer, the term of this patent is extended or adjusted under 35 U.S.C. 154(b) by 316 days.

(21) Appl. No.: 18/267,937

(22) PCT Filed: Dec. 17, 2021

(86) PCT No.: PCT/GB2021/053353
§ 371 (c)(1),
(2) Date: Jun. 16, 2023

(87) PCT Pub. No.: WO2022/129938
PCT Pub. Date: Jun. 23, 2022

(65) Prior Publication Data
US 2024/0112502 A1 Apr. 4, 2024

(30) Foreign Application Priority Data
Dec. 18, 2020 (GB) ..................................... 2020204

(51) Int. Cl.
*G07B 17/00* (2006.01)
*B07C 3/18* (2006.01)

(52) U.S. Cl.
CPC .......... *G07B 17/00661* (2013.01); *B07C 3/18* (2013.01); *G07B 2017/00064* (2013.01); *G07B 2017/00725* (2013.01)

(58) Field of Classification Search
CPC .... G07B 17/00661; G07B 2017/00725; B07C 3/18; B07C 3/00; G06Q 50/60
See application file for complete search history.

(56) References Cited

U.S. PATENT DOCUMENTS

| | | | | |
|---|---|---|---|---|
| 6,370,259 | B1 | 4/2002 | Hobson et al. | |
| 2019/0180520 | A1* | 6/2019 | Garbos | G06Q 30/0601 |
| 2020/0290089 | A1* | 9/2020 | Blohm | H04L 9/3239 |

FOREIGN PATENT DOCUMENTS

| | | | | |
|---|---|---|---|---|
| EP | 3425594 A1 | | 1/2019 | |
| WO | WO-2020038715 A1 | * | 2/2020 | G07B 17/00661 |

OTHER PUBLICATIONS

POSTNL, "Postzegelcode instructie video 20sec 1", YouTube, Aug. 7, 2019, 21 seconds, URL: https://www.youtube.com/watch?v=cpsY5UTLC1I, last accessed Jun. 15, 2023.

* cited by examiner

*Primary Examiner* — Amandeep Saini
*Assistant Examiner* — Jaspreet Kaur
(74) *Attorney, Agent, or Firm* — Bradley Arant Boult Cummings LLP

(57) ABSTRACT

A method of verifying the identity of a mail item, the method comprising obtaining a first visual representation of at least a portion of a mail item, determining a first postal identifier based on the first visual representation, obtaining a second visual representation of at least a portion of the mail item, determining a second postal identifier based on the second visual representation, comparing the second postal identifier with the first postal identifier, and enabling processing of the mail item based on the comparison step.

17 Claims, 18 Drawing Sheets

HANDLING OF MAIL ITEMS

FIELD OF THE INVENTION

This invention relates to methods and systems for handling mail items and particularly, but not exclusively, verifying the identity of mail items.

BACKGROUND TO THE INVENTION

Modern postal, delivery and courier systems allow mail items (e.g., letters, goods and other items) to be shipped worldwide.

Mail items are handled by carriers (such as postal services providers, courier companies or logistics companies). For a suitable fee, the mail item is shipped or transmitted to the recipient. The fee is typically payable by the person or entity sending the mail item ahead of the mail item being shipped or transmitted.

Traditionally, payment of the postage or shipping fee is indicated on the mail item by a suitable mark, symbol or other indicator. The most common of such marks is the adhesive stamp. However, adhesive stamps have numerous drawbacks and disadvantages. Firstly, it may be costly to manufacture adhesive stamps in the quantities necessary. Furthermore, given that adhesive stamps have an intrinsic value (similarly to paper note currency), it is necessary that they are safely stored and transported before use by the relevant entity (e.g., postal services providers). Yet further, even once used, there is a risk that adhesive stamps can be fraudulently re-used by third parties (e.g., by removing adhesive stamps from used envelopes, cleaning the stamps and re-attaching them to a mail item).

Other indicators of postage fees having been paid include Postage Paid Impressions (PPI) and, more recently, so-called "digital postage" marks. In such systems, the identifying marks or symbols are printed onto the mail item by way of a suitable device, such as a printer or a franking machine.

However, whilst these systems do not require safe and secure storage like adhesive stamps, these systems require the use of franking machines or suitable printers, which may be expensive or inconvenient for some users (e.g., private persons who may not post sufficient quantities of mail items). Whilst a private person can, in some instances, use such systems by visiting a suitable outlet (e.g., a postal office), this may be inconvenient and time consuming. In some instances, a private person may not even have access to a suitable outlet.

Furthermore, PPI and similar systems are prone to fraud or misuse. For example, a PPI impression, similarly to an adhesive stamp, is not uniquely linked to a specific mail item. There is, therefore, a risk that it may be fraudulently reused (e.g., by being copied by an unauthorised third party).

Yet further, existing solutions, such as adhesive stamps or PPI, do not allow for any shortfalls in postage or shipping fees to be recovered from the sender. Once applied to the mail item, there is no link between the postage indicator or mark and the sender. Accordingly, in the event of a fee shortfall or other discrepancy, the carrier must recover any shortage of fees from the recipient, which may be problematic The inventors have appreciated the above-mentioned problems with the existing technologies.

SUMMARY OF THE INVENTION

The inventors have identified a need for a system and associated methods that enable all users to send mail items without being required to either purchase specific equipment or physically visit a suitable outlet.

Further, the inventors have identified a need for a system and associated methods that reduces the risk of or prevents fraudulent behaviour, e.g., by reuse or theft of stamps or PPI indicators.

In accordance with a first aspect of the invention, there is provided a method of verifying the identity of a mail item, the method comprising:

- obtaining a first visual representation of at least a portion of a mail item;
- determining a first postal identifier based on the first visual representation;
- obtaining a second visual representation of at least a portion of the mail item;
- determining a second postal identifier based on the second visual representation; and
- comparing the second postal identifier with the first postal identifier.

The method may further comprise enabling processing of the mail item based on a successful comparison step. The processing may be performed by a first carrier. The processing may be carried out in a distribution centre operated by the first carrier.

The method may comprise the step of affixing the first postal identifier to the mail item. The step of affixing the first postal identifier to the mail item may be carried out by writing the first postal identifier on the mail item. The step of writing the first postal identifier on the mail item may be carried out by hand-writing.

The step of obtaining a first visual representation may comprise using a first imaging component to obtain an image of the portion of the mail item. The imaging component may be a camera component. The imaging component may be a camera component that is part of a user device. The first visual representation may comprise additional data, the additional data comprising one or more of: a time stamp; location data; mail item data; user-related data; or user device data.

The step of determining a first postal identifier may comprise:

- extracting at least one first characteristic from the first visual representation; and
- generating the first postal identifier based on the at least one first characteristic.

The first postal identifier may comprise at least a portion of the at least one first characteristic. The first postal identifier may comprise substantially the entirety of the at least one first characteristic. The first postal identifier may comprise one or more additional sections, portions or subdivisions, each of which may comprise additional data. The additional data may comprise one or more of: an indicator of the origin country of the mail item; and indicator of the destination country of the mail item; origin address of the mail item; destination address of the mail item; a service type of the mail item; or class designator for the mail item.

The step of extracting may comprise extracting at least a first identifier from the first visual representation.

The first identifier may comprise one of: a first generated sequence of characters; or one of plurality of predetermined sequences of characters. The first identifier may comprise one or more of: numerals; digits; characters; letters; symbols; graphemes; syllabograms; or glyphs.

The first identifier may comprise a first generated sequence of alphanumeric characters. The first identifier may comprise a first generated sequence of digits.

The first identifier may comprise one of a plurality of predetermined sequences of alphanumeric characters. The first identifier may comprise one of a plurality of predetermined sequences of digits.

The first identifier may comprise a plurality of characters. The first identifier may comprise at least 2 characters; optionally at least 3 characters; optionally at least 4 characters; optionally at least 5 characters; optionally at least 6 characters; optionally at least 7 characters; optionally at least 8 characters; optionally at least 9 characters; optionally at least 10 characters; optionally at least 11 characters; optionally at least 12 characters; optionally at least 13 characters; optionally at least 14 characters; optionally at least 15 characters; optionally at least 16 characters; optionally at least 17 characters; optionally at least 18 characters; optionally at least 19 characters; optionally at least 20 characters.

The step of extracting may further comprise extracting a second identifier from the first visual representation, wherein the second identifier comprises at least a portion of a destination address. The second identifier may comprise at least a portion of a destination postal code.

The step of extracting may comprise performing one of: image recognition; pattern recognition; optical character recognition; or intelligent character recognition.

The method may further comprise a step of activating the first postal identifier. The step of activating may comprise associating the first postal identifier with at least one of: an additional identifying data element; or an additional data element. The at least one additional identifying data element may comprise one or more of a: origin postal code; destination postal code; origin country code; destination country code; address of origin; destination address; payment confirmation; payment status; user identifier; recipient identifier; service type of the mail item; or class designator for the mail item.

The at least one additional data element may comprise one or more of a: time stamp; validity period indicator; or status flag.

The step of associating the first postal identifier may comprise creating a first mail item record, wherein the first mail item record comprises the first postal identifier and the at least one of the additional identifying data element or additional data element. The first mail item record may comprise a plurality of additional identifying data elements. The first mail item record may comprise a plurality of additional data elements.

The method may comprise transmitting the first mail item record to a remote device or system. The remote device or system may comprise: a computer system comprised of one or more devices; a user device; a server device or system; a cloud storage system; or any suitable remote data handling system.

The remote system may be operated by a first entity. The first entity may be the first carrier. The first entity may be a mail verification service operator. The first entity may be the first carrier. The first entity may be an operator of an app installed on the user device. The first entity may be an operator of a distribution centre.

The step of obtaining a second visual representation may comprise using a second imaging component to obtain an image of the portion of the mail item.

The step of determining a second postal identifier may comprise:

- extracting at least one second characteristic from the second visual representation, the at least one second characteristic corresponding to the at least one first characteristic; and
- determining the second postal identifier based on the at least one second characteristic.

The step of comparing may comprise:

- creating a first entry in a record of activated mail items based at least on the first postal identifier; and
- comparing the second postal identifier with the record of activated mail items.

The step of comparing may further comprise:

- receiving a first mail item record; and
- extracting at least the first postal identifier from the first mail item record. The first mail item record may be received from a suitable system or device. The first mail item record may be received from a remote device.

The step of comparing may further comprise modifying the first entry in the record of activated mail items if the second postal identifier is detected in the record of activated mail items. The step of modifying may comprise removing the first entry from the record of activated mail items. The step of modifying may comprise adding a status flag to the first entry. The step of modifying may comprise altering a status flag in the first entry.

The step of comparing may further comprise:

- extracting the at least one of the additional identifying data element or additional data element from the first mail item record; and
- adding the at least one of the additional identifying data element or additional data element to the first entry in the record of activated mail items.

The method may further comprise a step of modifying the first entry based on one or more criteria. The step of modifying may comprise removing the first entry.

The step of modifying may comprise adding a status flag to the first entry. The step of modifying may comprise altering a status flag in the first entry.

The one or more criteria may comprise expiry of a validity period based on a time stamp associated with the mail item. The one or more criteria may comprise a result of a comparison step.

The method may further comprise:

- comparing the second postal identifier with a list of processed identifiers; and
- preventing processing of the mail item if the second postal identifier is detected in the list of processed identifiers.

Further, the second postal identifier may be added to the list of processed identifiers based on a successful comparison between the second postal identifier with the first postal identifier.

The step of comparing the second postal identifier to the first postal identifier may further comprise:

- identifying a first set of visual features of the first visual representation;
- identifying a second set of visual features of the second visual representation; and
- comparing the first set of visual features to the second set of visual features.

In accordance with a second aspect of the invention, there is provided a method of identifying a mail item, the method comprising:

- obtaining a first visual representation of at least a portion of a mail item;
- determining a first postal identifier based on the first visual representation;
- obtaining a second visual representation of at least a portion of the mail item;
- determining a second postal identifier based on the second visual representation; and comparing the second postal identifier with the first postal identifier.

The method may further comprise enabling processing of the mail item based on a successful comparison step. The processing may be performed by a first carrier. The processing may be carried out in a distribution centre operated by the first carrier.

The step of obtaining a first visual representation may comprise using a first imaging component to obtain an image of the portion of the mail item. The imaging component may be a camera component. The imaging component may be a camera component that is part of a user device. The first visual representation may comprise additional data, the additional data comprising one or more of: a time stamp; location data; mail item data; user-related data; or user device data.

The step of determining a first postal identifier may comprise:

extracting at least one first characteristic from the first visual representation; and generating the first postal identifier based on the at least one first characteristic.

The first postal identifier may comprise at least a portion of the at least one first characteristic. The first postal identifier may comprise substantially the entirety of the at least one first characteristic. The first postal identifier may comprise one or more additional sections, portions or subdivisions, each of which may comprise additional data. The additional data may comprise one or more of: an indicator of the origin country of the mail item; and indicator of the destination country of the mail item; origin address of the mail item; destination address of the mail item; a service type of the mail item; or class designator for the mail item.

The step of extracting may comprise extracting at least a first identifier from the first visual representation.

The first identifier may comprise one of: a first generated sequence of characters; or one of plurality of predetermined sequences of characters. The first identifier may comprise one or more of: numerals; digits; characters; letters; symbols; graphemes; syllabograms; or glyphs.

The first identifier may comprise a first generated sequence of alphanumeric characters. The first identifier may comprise a first generated sequence of digits.

The first identifier may comprise one of a plurality of predetermined sequences of alphanumeric characters. The first identifier may comprise one of a plurality of predetermined sequences of digits.

The first identifier may comprise a plurality of characters. The first identifier may comprise at least 2 characters; optionally at least 3 characters; optionally at least 4 characters; optionally at least 5 characters; optionally at least 6 characters; optionally at least 7 characters; optionally at least 8 characters; optionally at least 9 characters; optionally at least 10 characters; optionally at least 11 characters;

optionally at least 12 characters; optionally at least 13 characters; optionally at least 14 characters; optionally at least 15 characters; optionally at least 16 characters; optionally at least 17 characters; optionally at least 18 characters; optionally at least 19 characters; optionally at least 20 characters.

The step of extracting may further comprise extracting a second identifier from the first visual representation, wherein the second identifier comprises at least a portion of a destination address. The second identifier may comprise at least a portion of a destination postal code.

The step of extracting may comprise performing one of: image recognition; pattern recognition; optical character recognition; or intelligent character recognition.

The method may further comprise a step of activating the first postal identifier. The step of activating may comprise associating the first postal identifier with at least one of: an additional identifying data element; or an additional data element. The at least one additional identifying data element may comprise one or more of a: origin postal code; destination postal code; origin country code; destination country code; address of origin; destination address; payment confirmation; payment status; user identifier; recipient identifier; service type of the mail item; or class designator for the mail item.

The at least one additional data element may comprise one or more of a: time stamp; validity period indicator; or status flag.

The step of associating the first postal identifier may comprise creating a first mail item record, wherein the first mail item record comprises the first postal identifier and the at least one of the additional identifying data element or additional data element. The first mail item record may comprise a plurality of additional identifying data elements. The first mail item record may comprise a plurality of additional data elements.

The method may comprise transmitting the first mail item record to a remote device or system. The remote device or system may comprise: a computer system comprised of one or more devices; a user device; a server device or system; a cloud storage system; or any suitable remote data handling system.

The remote system may be operated by a first entity. The first entity may be the first carrier. The first entity may be a mail verification service operator. The first entity may be the first carrier. The first entity may be an operator of an app installed on the user device. The first entity may be an operator of a distribution centre.

The step of obtaining a second visual representation may comprise using a second imaging component to obtain an image of the portion of the mail item.

The step of determining a second postal identifier may comprise:

extracting at least one second characteristic from the second visual representation, the at least one second characteristic corresponding to the at least one first characteristic; and determining the second postal identifier based on the at least one second characteristic.

The step of comparing may comprise:

creating a first entry in a record of activated mail items based at least on the first postal identifier; and comparing the second postal identifier with the record of activated mail items.

The step of comparing may further comprise:

receiving a first mail item record; and extracting at least the first postal identifier from the first mail item record.

The first mail item record may be received from a suitable system or device. The first mail item record may be received from a remote device.

The step of comparing may further comprise modifying the first entry in the record of activated mail items if the second postal identifier is detected in the record of activated mail items. The step of modifying may comprise removing the first entry from the record of activated mail items. The step of modifying may comprise adding a status flag to the first entry. The step of modifying may comprise altering a status flag in the first entry.

The step of comparing may further comprise:

extracting the at least one of the additional identifying data element or additional data element from the first mail item record; and adding the at least one of the additional identifying data element or additional data element to the first entry in the record of activated mail items.

The method may further comprise a step of modifying the first entry based on one or more criteria. The step of modifying may comprise removing the first entry. The step of modifying may comprise adding a status flag to the first entry. The step of modifying may comprise altering a status flag in the first entry.

The one or more criteria may comprise expiry of a validity period based on a time stamp associated with the mail item. The one or more criteria may comprise a result of a comparison step.

The method may further comprise:

comparing the second postal identifier with a list of processed identifiers; and preventing processing of the mail item if the second postal identifier is detected in the list of processed identifiers.

Further, the second postal identifier may be added to the list of processed identifiers based on a successful comparison between the second postal identifier with the first postal identifier.

The step of comparing the second postal identifier to the first postal identifier may further comprise:

identifying a first set of visual features of the first visual representation;

identifying a second set of visual features of the second visual representation; and comparing the first set of visual features to the second set of visual features.

Embodiments of the second aspect of the present invention may include one or more features of the first aspect of the present invention or its embodiments. Similarly, embodiments of the first aspect of the present invention may include one or more features of the second aspect of the present invention or its embodiments.

In accordance with a third aspect of the invention, there is provided a method of identifying a mail item, the method comprising:

obtaining a first visual representation of at least a portion of a mail item;

determining a first identifier based on the first visual representation;

obtaining a second visual representation of at least a portion of the mail item; and verifying the identity of the mail item based on the second visual representation and the first identifier.

The first identifier may be a unique identifier. The first identifier may be a postal identifier.

The method may comprise the further step of determining a second identifier based on the second visual representation. The step of verifying may comprise comparing the second identifier with the first identifier.

The second identifier may be a unique identifier. The second identifier may be a postal identifier.

The method may further comprise enabling processing of the mail item based on a successful comparison step. The processing may be performed by a first carrier. The processing may be carried out in a distribution centre operated by the first carrier.

The step of obtaining a first visual representation may comprise using a first imaging component to obtain an image of the portion of the mail item. The imaging component may be a camera component. The imaging component may be a camera component that is part of a user device. The first visual representation may comprise additional data, the additional data comprising one or more of: a time stamp; location data; mail item data; user-related data; or user device data.

The step of determining a first identifier may comprise:

extracting at least one first characteristic from the first visual representation; and generating the first identifier based on the at least one first characteristic.

The first identifier may comprise at least a portion of the at least one first characteristic. The first identifier may comprise substantially the entirety of the at least one first characteristic. The first identifier may comprise one or more additional sections, portions or subdivisions, each of which may comprise additional data. The additional data may comprise one or more of: an indicator of the origin country of the mail item; and indicator of the destination country of the mail item; origin address of the mail item; destination address of the mail item; a service type of the mail item; or class designator for the mail item.

The step of extracting may comprise extracting at least a first item identifier from the first visual representation.

The item identifier may comprise one of: a first generated sequence of characters; or one of plurality of predetermined sequences of characters. The item identifier may comprise one or more of: numerals; digits; characters; letters; symbols;

graphemes; syllabograms; or glyphs.

The item identifier may comprise a first generated sequence of alphanumeric characters. The first item identifier may comprise a first generated sequence of digits.

The item identifier may comprise one of a plurality of predetermined sequences of alphanumeric characters. The first item identifier may comprise one of a plurality of predetermined sequences of digits.

The first item identifier may comprise a plurality of characters. The first item identifier may comprise at least 2 characters; optionally at least 3 characters; optionally at least 4 characters; optionally at least 5 characters; optionally at least 6 characters; optionally at least 7 characters; optionally at least 8 characters; optionally at least 9 characters; optionally at least 10 characters; optionally at least 11 characters; optionally at least 12 characters; optionally at least 13 characters; optionally at least 14 characters; optionally at least 15 characters; optionally at least 16 characters; optionally at least 17 characters; optionally at least 18 characters; optionally at least 19 characters; optionally at least 20 characters.

The step of extracting may further comprise extracting a second item identifier from the first visual representation, wherein the second item identifier comprises at least a portion of a destination address. The second item identifier may comprise at least a portion of a destination postal code.

The step of extracting may comprise performing one of: image recognition; pattern recognition; optical character recognition; or intelligent character recognition.

The method may further comprise a step of activating the first identifier. The step of activating may comprise associating the first identifier with at least one of: an additional identifying data element; or an additional data element. The at least one additional identifying data element may comprise one or more of a: origin postal code; destination postal code; origin country code; destination country code; address of origin; destination address; payment confirmation; payment status; user identifier; recipient identifier; service type of the mail item; or class designator for the mail item.

The at least one additional data element may comprise one or more of a: time stamp; validity period indicator; or status flag.

The step of associating the first identifier may comprise creating a first mail item record, wherein the first mail item record comprises the first identifier and the at least one of the additional identifying data element or additional data element. The first mail item record may comprise a plurality of additional identifying data elements. The first mail item record may comprise a plurality of additional data elements.

The method may comprise transmitting the first mail item record to a remote device or system. The remote device or system may comprise: a computer system comprised of one or more devices; a user device; a server device or system; a cloud storage system; or any suitable remote data handling system.

The remote system may be operated by a first entity. The first entity may be the first carrier. The first entity may be a mail verification service operator. The first entity may be the first carrier. The first entity may be an operator of an app installed on the user device. The first entity may be an operator of a distribution centre.

The step of obtaining a second visual representation may comprise using a second imaging component to obtain an image of the portion of the mail item.

The step of determining a second identifier may comprise:

- extracting at least one second characteristic from the second visual representation, the at least one second characteristic corresponding to the at least one first characteristic; and
- determining the second identifier based on the at least one second characteristic.

The step of verifying may comprise:

- creating a first entry in a record of activated mail items based at least on the first postal identifier; and
- comparing the second identifier with the record of activated mail items.

The step of verifying may further comprise:

- receiving a first mail item record; and
- extracting at least the first identifier from the first mail item record.

The first mail item record may be received from a suitable system or device. The first mail item record may be received from a remote device.

The step of verifying may further comprise modifying the first entry in the record of activated mail items if the second postal identifier is detected in the record of activated mail items. The step of modifying may comprise removing the first entry from the record of activated mail items. The step of modifying may comprise adding a status flag to the first entry. The step of modifying may comprise altering a status flag in the first entry.

The step of verifying may further comprise:

- extracting the at least one of the additional identifying data element or additional data element from the first mail item record; and
- adding the at least one of the additional identifying data element or additional data element to the first entry in the record of activated mail items.

The method may further comprise a step of modifying the first entry based on one or more criteria. The step of modifying may comprise removing the first entry. The step of modifying may comprise adding a status flag to the first entry. The step of modifying may comprise altering a status flag in the first entry.

The one or more criteria may comprise expiry of a validity period based on a time stamp associated with the mail item. The one or more criteria may comprise a result of a comparison step.

The method may further comprise:

- comparing the second identifier with a list of processed identifiers; and
- preventing processing of the mail item if the second identifier is detected in the list of processed identifiers.

Further, the second identifier may be added to the list of processed identifiers based on a successful comparison between the second identifier with the first identifier.

The step of verifying may further comprise:

- identifying a first set of visual features of the first visual representation;
- identifying a second set of visual features of the second visual representation; and
- comparing the first set of visual features to the second set of visual features.

Embodiments of the third aspect of the present invention may include one or more features of the first or second aspects of the present invention or its embodiments. Similarly, embodiments of the first or second aspects of the present invention may include one or more features of the third aspect of the present invention or its embodiments.

In accordance with a fourth aspect of the invention, there is provided a method for a user device, the method comprising:

- obtaining a first visual representation of at least a portion of a mail item; and
- transmitting a first data packet to a remote device, the first data packet comprising data associated with at least the first visual representation of the mail item.

The data may comprise the first visual representation. The data may comprise a first postal identifier determined based on the first visual representation.

The step of obtaining a first visual representation may comprise using a first imaging component to obtain an image of the portion of the mail item. The imaging component may be a camera component. The imaging component may be a camera component that is part of a user device. The first visual representation may comprise additional data, the additional data comprising one or more of: a time stamp; location data; mail item data; user-related data; or user device data.

The method may further comprise:

- determining a first postal identifier based on the first visual representation; and
- adding the first postal identifier to the first data packet.

The step of determining a first postal identifier may comprise:

- extracting at least one first characteristic from the first visual representation; and
- generating the first postal identifier based on the at least one first characteristic.

The first postal identifier may comprise at least a portion of the at least one first characteristic. The first postal identifier may comprise substantially the entirety of the at least one first characteristic. The first postal identifier may comprise one or more additional sections, portions or subdivisions, each of which may comprise additional data. The additional data may comprise one or more of: an indicator of the origin country of the mail item; and indicator of the destination country of the mail item; origin address of the mail item; destination address of the mail item; a service type of the mail item; or class designator for the mail item.

The step of extracting may comprise extracting at least a first identifier from the first visual representation.

The first identifier may comprise one of: a first generated sequence of characters; or one of plurality of predetermined sequences of characters. The first identifier may comprise one or more of: numerals; digits; characters; letters; symbols; graphemes; syllabograms; or glyphs.

The first identifier may comprise a first generated sequence of alphanumeric characters. The first identifier may comprise a first generated sequence of digits.

The first identifier may comprise one of a plurality of predetermined sequences of alphanumeric characters. The first identifier may comprise one of a plurality of predetermined sequences of digits.

The first identifier may comprise a plurality of characters. The first identifier may comprise at least 2 characters; optionally at least 3 characters; optionally at least 4 characters; optionally at least 5 characters; optionally at least 6 characters; optionally at least 7 characters; optionally at least 8 characters; optionally at least 9 characters; optionally at least 10 characters; optionally at least 11 characters; optionally at least 12 characters; optionally at least 13 characters; optionally at least 14 characters; optionally at least 15 characters; optionally at least 16 characters; optionally at least 17 characters; optionally at least 18 characters; optionally at least 19 characters; optionally at least 20 characters.

The step of extracting may further comprise extracting a second identifier from the first visual representation, wherein the second identifier comprises at least a portion of a destination address. The second identifier may comprise at least a portion of a destination postal code.

The step of extracting may comprise performing one of: image recognition; pattern recognition; optical character recognition; or intelligent character recognition.

The method may further comprise a step of activating the first postal identifier. The step of activating may comprise associating the first postal identifier with at least one of: an additional identifying data element; or an additional data element.

The at least one additional identifying data element may comprise one or more of a: origin postal code; destination postal code; origin country code; destination country code; address of origin; destination address; payment confirmation; payment status; user identifier; recipient identifier; service type of the mail item; or class designator for the mail item.

The at least one additional data element may comprise one or more of a: time stamp; validity period indicator; or status flag.

The step of associating the first postal identifier may comprise creating a first mail item record, wherein the first mail item record comprises the first postal identifier and the at least one of the additional identifying data element or additional data element. The first mail item record may comprise a plurality of additional identifying data elements. The first mail item record may comprise a plurality of additional data elements. The first mail item record may be comprised in the first data packet. The first data packet may be comprised substantially entirely of the first mail item record.

Embodiments of the fourth aspect of the present invention may include one or more features of the first, second or third aspects of the present invention or its embodiments. Similarly, embodiments of the first, second or third aspects of the present invention may include one or more features of the fourth aspect of the present invention or its embodiments.

In accordance with a fifth aspect of the invention, there is provided a method for a computing device, the method comprising:

- receiving at least a first data packet from a user device, the first data packet comprising first data associated with at least a first visual representation of a mail item;
- receiving at least a second data packet from a distribution centre device, the second data packet comprising second data associated with at least a second visual representation of a mail item;
- comparing the first data with the second data; and
- transmitting a comparison result to the distribution centre device.

The first data may comprise the first visual representation. The first data may comprise a first postal identifier determined based on the first visual representation.

The second data may comprise the second visual representation. The second data may comprise a second postal identifier determined based on the second visual representation.

The method may further comprise:

- determining a first postal identifier based on the first visual representation;
- determining a second postal identifier based on the second visual representation; and
- comparing the second postal identifier with the first postal identifier.

The step of determining a first postal identifier may comprise:

- extracting at least one first characteristic from the first visual representation; and
- generating the first postal identifier based on the at least one first characteristic.

The first postal identifier may comprise at least a portion of the at least one first characteristic. The first postal identifier may comprise substantially the entirety of the at least one first characteristic. The first postal identifier may comprise one or more additional sections, portions or subdivisions, each of which may comprise additional data. The additional data may comprise one or more of: an indicator of the origin country of the mail item; and indicator of the destination country of the mail item; origin address of the mail item; destination address of the mail item; a service type of the mail item; or class designator for the mail item.

The step of extracting may comprise extracting at least a first identifier from the first visual representation.

The first identifier may comprise one of: a first generated sequence of characters; or one of plurality of predetermined sequences of characters. The first identifier may comprise one or more of: numerals; digits; characters; letters; symbols; graphemes; syllabograms; or glyphs.

The first identifier may comprise a first generated sequence of alphanumeric characters. The first identifier may comprise a first generated sequence of digits.

The first identifier may comprise one of a plurality of predetermined sequences of alphanumeric characters. The first identifier may comprise one of a plurality of predetermined sequences of digits.

The first identifier may comprise a plurality of characters. The first identifier may comprise at least 2 characters; optionally at least 3 characters; optionally at least 4 characters; optionally at least 5 characters; optionally at least 6 characters; optionally at least 7 characters; optionally at least 8 characters; optionally at least 9 characters; optionally at least 10 characters; optionally at least 11 characters; optionally at least 12 characters; optionally at least 13 characters; optionally at least 14 characters; optionally at least 15 characters; optionally at least 16 characters; optionally at least 17 characters; optionally at least 18 characters; optionally at least 19 characters; optionally at least 20 characters.

The step of extracting may further comprise extracting a second identifier from the first visual representation, wherein the second identifier comprises at least a portion of a destination address. The second identifier may comprise at least a portion of a destination postal code.

The step of extracting may comprise performing one of: image recognition; pattern recognition; optical character recognition; or intelligent character recognition.

The method may further comprise a step of activating the first postal identifier. The step of activating may comprise associating the first postal identifier with at least one of: an additional identifying data element; or an additional data element. The at least one additional identifying data element may comprise one or more of a: origin postal code; destination postal code; origin country code; destination country code; address of origin; destination address; payment confirmation; payment status; user identifier; recipient identifier; service type of the mail item; or class designator for the mail item.

The at least one additional data element may comprise one or more of a: time stamp; validity period indicator; or status flag.

The step of associating the first postal identifier may comprise creating a first mail item record, wherein the first mail item record comprises the first postal identifier and the at least one of the additional identifying data element or additional data element. The first mail item record may comprise a plurality of additional identifying data elements. The first mail item record may comprise a plurality of additional data elements.

The method may further comprise a step of determining a second postal identifier based on the second visual representation of the mail item.

The step of determining a second postal identifier may comprise:

- extracting at least one second characteristic from the second visual representation, the at least one second characteristic corresponding to the at least one first characteristic; and
- determining the second postal identifier based on the at least one second characteristic.

The step of comparing may comprise:

- creating a first entry in a record of activated mail items based at least on the first postal identifier; and
- comparing the second postal identifier with the record of activated mail items.

The first data may comprise a first mail item record, the first mail item record comprising at least the first postal identifier. The step of comparing may further comprise extracting at least the first postal identifier from the first mail item record.

The step of comparing may further comprise modifying the first entry in the record of activated mail items if the second postal identifier is detected in the record of activated mail items. The step of modifying may comprise removing the first entry from the record of activated mail items. The step of modifying may comprise adding a status flag to the first entry. The step of modifying may comprise altering a status flag in the first entry.

The step of comparing may further comprise:

- extracting the at least one of the additional identifying data element or additional data element from the first mail item record; and
- adding the at least one of the additional identifying data element or additional data element to the first entry in the record of activated mail items.

The at least one additional identifying data element may comprise a time stamp associated with the mail item.

The method may further comprise a step of modifying the first entry based on one or more criteria. The step of modifying may comprise removing the first entry.

The step of modifying may comprise adding a status flag to the first entry. The step of modifying may comprise altering a status flag in the first entry.

The one or more criteria may comprise expiry of a validity period based on a time stamp associated with the mail item. The one or more criteria may comprise a result of a comparison step.

The method may further comprise:

- comparing the second postal identifier with a list of processed identifiers; and
- preventing processing of the mail item if the second postal identifier is detected in the list of processed identifiers.

Further, the second postal identifier may be added to the list of processed identifiers based on a successful comparison between the second postal identifier with the first postal identifier.

The step of comparing the second postal identifier to the first postal identifier may further comprise:

- identifying a first set of visual features of the first visual representation;
- identifying a second set of visual features of the second visual representation; and comparing the first set of visual features to the second set of visual features.

Embodiments of the fifth aspect of the present invention may include one or more features of the first, second, third, or fourth aspects of the present invention or their embodiments. Similarly, embodiments of the first, second, third or fourth aspects of the present invention may include one or more features of the fifth aspect of the present invention or its embodiments.

In accordance with a sixth aspect of the invention, there is provided a method for a distribution centre device, the method comprising:

- obtaining a second visual representation of at least a portion of a mail item;
- transmitting a second data packet to a computing device, the second data packet comprising at least second data associated with the second visual representation.

The method may further comprise:

- determining a second postal identifier based on the second visual representation; and
- adding the second postal identifier to the second data packet.

The step of obtaining a second visual representation may comprise using a second imaging component to obtain an image of the portion of the mail item.

The step of determining a second postal identifier may comprise:

- extracting at least one second characteristic from the second visual representation; and
- determining the second postal identifier based on the at least one second characteristic.

Embodiments of the sixth aspect of the present invention may include one or more features of the first, second, third, fourth or fifth aspects of the present invention or their embodiments. Similarly, embodiments of the first, second, third, fourth or fifth aspects of the present invention may include one or more features of the sixth aspect of the present invention or its embodiments.

In accordance with a seventh aspect of the invention, there is provided a computer system comprising one or more processing devices, said one or more processing devices being connected by way of one or more connections, wherein the one or more processing devices are operable to perform a method as set out above.

Embodiments of the seventh aspect of the present invention may include one or more features of the first, second, third, fourth, fifth or sixth aspects of the present invention or their embodiments. Similarly, embodiments of the first, second, third, fourth, fifth or sixth aspects of the present invention may include one or more features of the seventh aspect of the present invention or its embodiments.

In accordance with an eighth aspect of the invention, there is provided a user device comprising at least a processing element and a communications element, the user device being operable to connect to a network, wherein the user device is operable to perform a method as set out above Embodiments of the eighth aspect of the present invention may include one or more features of the first, second, third, fourth, fifth, sixth or seventh aspects of the present invention or their embodiments. Similarly, embodiments of the first, second, third, fourth, fifth, sixth or seventh aspects of the present invention may include one or more features of the eighth aspect of the present invention or its embodiments.

In accordance with a ninth aspect of the present invention, there is provided a computing device comprising at least a processing element and a communications element, the computing device being operable to connect to a network, wherein the user device is operable to perform a method as set out above.

Embodiments of the ninth aspect of the present invention may include one or more features of the first, second, third, fourth, fifth, sixth, seventh or eighth aspects of the present invention or their embodiments. Similarly, embodiments of the first, second, third, fourth, fifth, sixth, seventh or eighth aspects of the present invention may include one or more features of the ninth aspect of the present invention or its embodiments.

In accordance with a tenth aspect of the present invention, there is provided a distribution centre device comprising at least a processing element and a communications element, the distribution centre device being operable to connect to a network, wherein the user device is operable to perform a method as set out above.

Embodiments of the tenth aspect of the present invention may include one or more features of the first, second, third, fourth, fifth, sixth, seventh, eighth or ninth aspects of the present invention or their embodiments. Similarly, embodiments of the first, second, third, fourth, fifth, sixth, seventh, eighth or ninth aspects of the present invention may include one or more features of the tenth aspect of the present invention or its embodiments.

In accordance with an eleventh aspect of the present invention, there is provided a computer program product comprising machine-readable instructions which, when executed by a computer, cause the computer to carry out a method as set out above.

Embodiments of the eleventh aspect of the present invention may include one or more features of the first, second, third, fourth, fifth, sixth, seventh, eighth, ninth or tenth aspects of the present invention or their embodiments. Similarly, embodiments of the first, second, third, fourth, fifth, sixth, seventh, eighth, ninth or tenth aspects of the present invention may include one or more features of the tenth aspect of the present invention or its embodiments.

BRIEF DESCRIPTION OF THE DRAWINGS

An embodiment of the invention will now be described, by way of example, with reference to the drawings, in which.

DESCRIPTION OF THE PREFERRED EMBODIMENTS

Before describing the exemplary embodiments of the invention, it may be illustrative to describe an exemplary environment in which the exemplary embodiments may be implemented. It will, of course, be appreciated that the following environment is exemplary only, and not intended to be limiting. Other environments, comprising alternative or additional components, may easily be envisaged.

Figure 1:
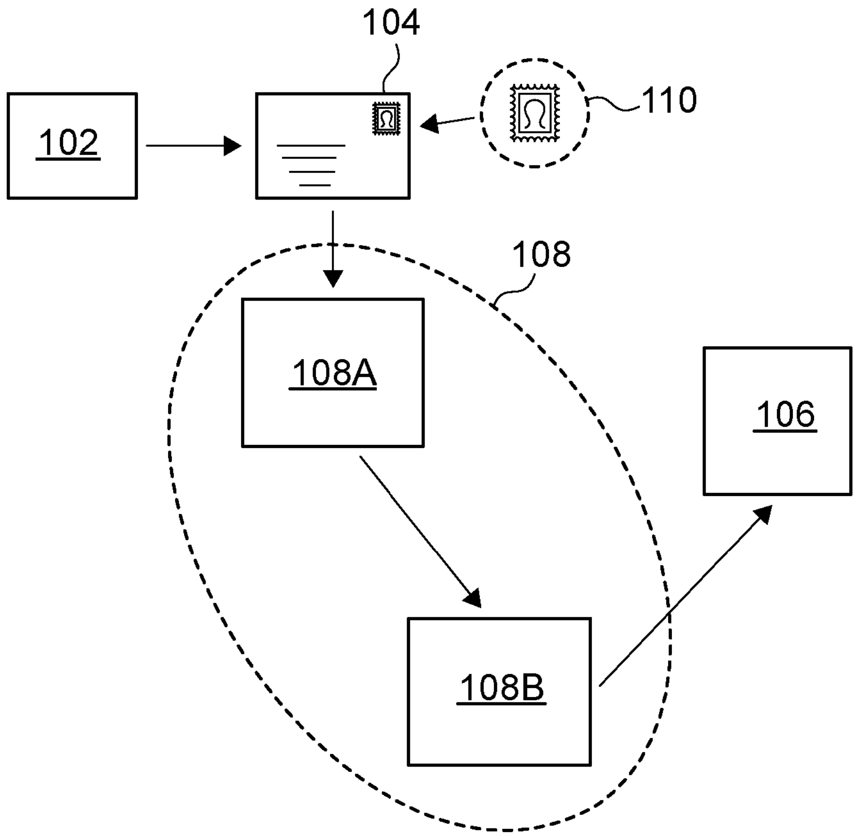
FIG. 1 illustrates a first exemplary environment in which the embodiments of the invention may be implemented.

An exemplary environment in which the embodiments of the present invention may be implemented will now be discussed with reference to FIG. 1.

A first entity 102 (e.g., a person or a company) intends to send a mail item 104 to a second entity 106. For simplicity of explanation, reference will be made in the following to a "first person", although it will be understood that this could refer to both a natural person or a legal person (e.g., a company or business).

Typically, the first person 102 has to engage with a first carrier 108 (e.g., postal services provider, courier company or logistics company). This will commonly involve the first person obtaining or procuring stamps, labels or other indicators of postage 110.

Once the appropriate postage products have been obtained, the first person 102 affixes the stamps or labels to the mail item 104. Subsequently, the first person brings the mail item to an instance of the first carrier (e.g., a post office) 108A to initiate the transmission process.

Once the mail item 104 has been posted or otherwise handed over to the first carrier 108, the mail item will be transmitted to a distribution centre 108B operated by the first carrier. In the distribution centre, the mail item is processed and sorted for further transmission to another distribution centre (e.g., if the mail item is to be transmitted to a different country) or it is sent out for distribution to the second entity.

It will be appreciated that the present environment is purely exemplary. In reality, any relevant number of distribution centres may be involved in the transmission of a mail item from the first entity and the second entity.

Further, due to recent advances in technology, a number of solutions have been developed that enable users to utilise electronic devices (e.g., portable devices, such as mobile phones, tablets, laptops or similar) to perform certain steps of the postal process. Additionally, postal services providers utilise a large degree of automation during the distribution process.

Figure 2:
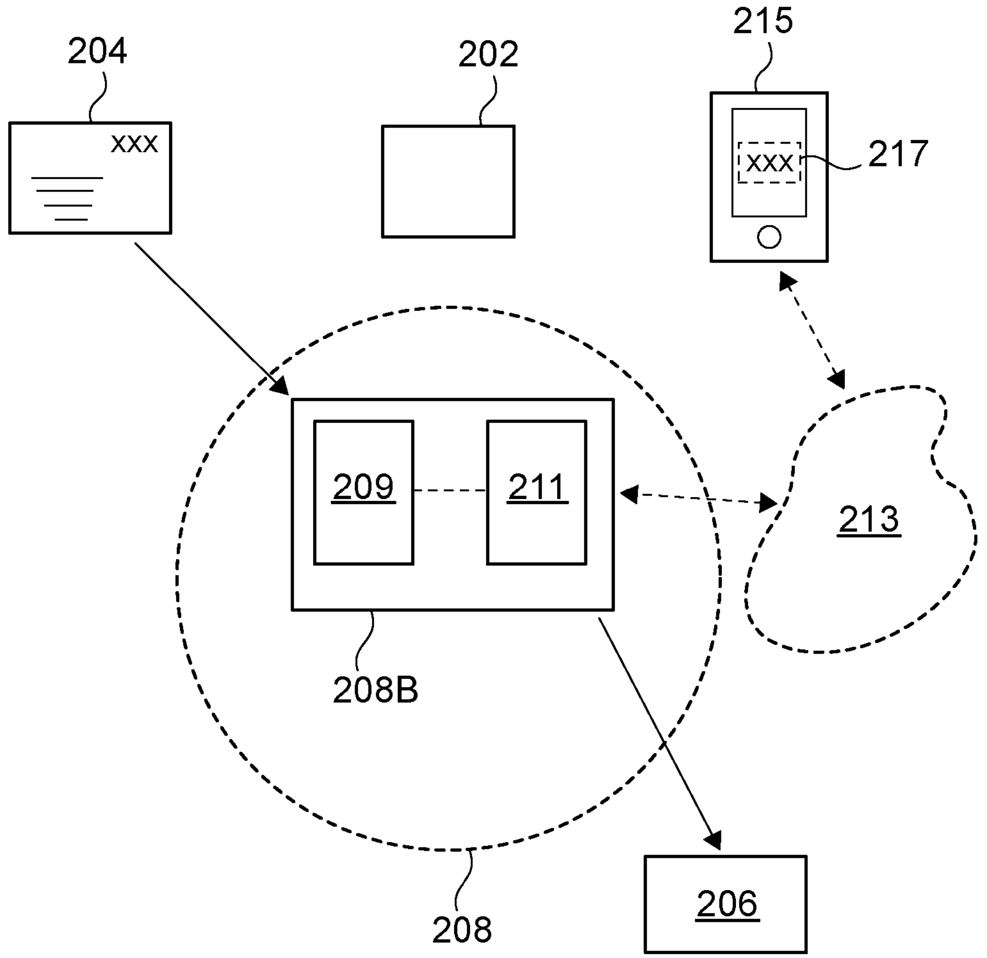
FIG. 2 illustrates a second exemplary environment in which the embodiments of the invention may be implemented.

A second exemplary environment in which the embodiments of the present invention may be implemented will now be discussed with reference to FIG. 2. For ease of comparison with FIG. 1, elements of FIG. 2 similar to corresponding elements of FIG. 1 are labelled with reference signs similar to those used in FIG. 1, but with prefix "2" instead of "1".

A first carrier 208 (e.g., a postal services provider, logistics company or courier service company) operates a distribution centre 208B which comprises a distribution computer system 209. The distribution computer system is used to control operations of the distribution centre. In the present example, the distribution computer system is operable to control an automated sorting system 211.

Mail items that enter the distribution centre 208B are scanned and sorted. The scanning step allows the progress of a mail item 204 to be tracked (for example via track-and-trace apps or websites). Further, in some cases it allows for the mail item to be automatically sorted by way of the automated sorting system.

The distribution computer system 209 is connected to an external computer network 213 (e.g., the internet or a Wide Access Network). The distribution computer system may use the external computer network to communicate with external systems, components or devices. For example, the above-mentioned track-and-trace functionality may send messages and/or updates to third parties by way of the external computer network.

In this exemplary environment, a user 202 intending to ship a mail item 204 by way of the first carrier 208 uses an application installed on a mobile device 215 to select a required service or product. Based on the user's selections and on successful payment being completed, the application may provide the user with a code 217 or other indicator that the user may apply to the surface of the mail item. The user then scans the mail item, typically by using a mobile device camera. The obtained image is forwarded to the first carrier in a suitable manner.

Subsequently, the user posts the mail item 204, after which it is forwarded in a conventional manner to the distribution centre 208B. At the distribution centre, the mail item is scanned in a conventional manner to detect the code or indicator or to verify the identity of the mail item. If successfully detected or verified, the mail item can be processed and delivered to the recipient 206. If not successfully verified, the mail item is rejected for further processing.

Known systems typically rely on pattern or feature recognition to verify the identity of any given mail item during the distribution process. This typically involves extracting features or patterns from the images to be identified and comparing the extracted features or patterns. However, such detection and comparison methods are susceptible to misidentification if the scanned surface changes between the scans. For example, if the mail item sustains damage or is rendered dirty, the second image may differ sufficiently from the first one to cause the mail item to be rejected Further, known systems rely on the veracity of the postage applied to the mail item. Purely as an example, traditional stamps can be detected on the surface of a mail item. Further, there is no way to verify whether the stamp was obtained legally by the user. It is known that traditional stamps, which have already been used for shipping a mail item, can be removed and illegally cleaned so as to enable illegal reuse of the stamp. Similarly, automatically issued codes or markers can be copied by unauthorised third parties and effectively reused.

Yet further, using traditional and known methods, there is no way to obtain any required additional payments from the user. For example, if the user wilfully or erroneously attached to little postage to the mail item, there is no method for the carrier to obtain correct payment from the user. Traditionally, this has resulted in any such additional charges being recovered from the recipient.

The inventor has appreciated the shortcomings of the existing methods.

An exemplary method in accordance with an aspect of the present invention will now be discussed with reference to FIG. 3 and FIG. 4.

In the exemplary method, a user intends to ship a mail item via a first carrier (e.g., a postal services provider or a courier company). The mail item may be any suitable item that could be shipped by way of a postal, courier or a logistics company.

In a first step 301, a first visual representation 402 of a portion of a mail item 404 is obtained. The first visual representation may be obtained in any suitable manner. The first visual representation may have any suitable format. Further, the first visual representation may have a suitable or relevant encryption or encoding. In some examples, the first visual representation may comprise additional information or data (e.g., without limitation, time stamps, location data, mail item data; user-related data or user device data).

In some examples, the first visual representation is obtained by using a first imaging component or device 406 to obtain an image of the portion of the mail item. Any suitable imaging component or device may be used, including (without limitation): a camera component on a mobile phone; a camera component on a tablet; a camera component on a general computing device; a scanner; a digital camera. In the present example, the first visual representation is obtained by using a camera on the user's mobile device.

The obtained image may have a suitable format and encoding. In some cases, the format and/or encoding of the obtained image is dependent on one or more of: the hardware of the device; the firmware or operating system installed on the device; any applications required to operate the imaging component.

In a second step 302, a first postal identifier 408 is determined based on the first visual representation. The first postal identifier may be determined in any suitable manner and using any suitable number of determination steps. A number of exemplary methodologies for determining the first postal identifier will be discussed in more detail in the following.

The first postal identifier may have any suitable format. The first postal identifier is formatted so as to uniquely identify the mail item during the distribution process in conjunction with other relevant data. Unlike known postal identifiers, the first postal identifier is not required, itself, be unique. It can therefore be kept shorter than known postal identifiers, which facilitates the act of applying the first postal identifier to the mail item.

In some examples, the first postal identifier is comprised of a sequence of characters. The first postal identifier may comprise one or more of: numerals; digits; characters; letters; symbols; graphemes; syllabograms; or glyphs. In some examples, the first postal identifier is comprised of a sequence of alphanumeric characters. In other examples, the first postal identifier is comprised of numerical characters only.

In some examples, the first postal identifier additionally comprises one or more additional sections or portions. Each of these additional sections may be comprised of one or more alphanumeric characters. The additional sections may comprise data indicative of one or more properties, characteristics or other data relating to the mail item. Including such additional sections may facilitate processing and/or distribution of the mail item.

As an example, the first postal identifier may comprise an additional section indicative of the country of origin of the mail item. As a further example, the unique identifier may comprise an additional section indicative of the destination country of the mail item.

Yet further, the first postal identifier may in some examples comprise an additional section indicative of the type of mail item. By way of explanation, most postal services providers operate a number of classes or categories of items to be shipped. By including an additional section indicative of the type or category of mail item, it can be ensured that the mail item is appropriately handled.

Yet further, the first postal identifier may in some examples comprise an additional section containing a checksum or check digit. Check digits are typically used to ensure that the formatting of a sequence can be verified automatically (to avoid formatting or other simple errors, such as missing digits or erroneous formatting). For example, the check digit may be used during one or more of the method steps of the present method.

Figure 5A:
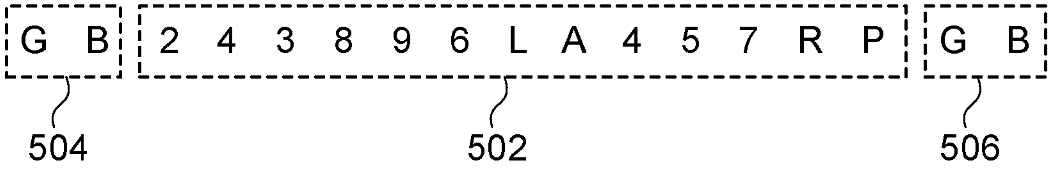
FIG. 5 shows a number of exemplary postal identifiers in accordance with the present invention.
Figure 5B:
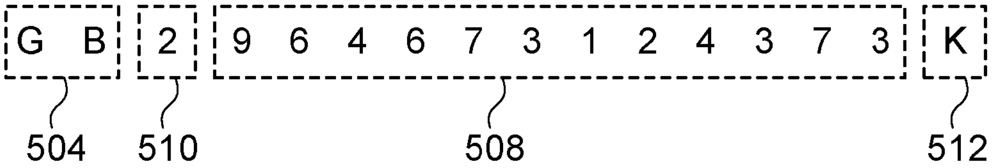

For ease of explanation, two exemplary postal identifiers will now be presented with reference to FIG. 5A and FIG. 5B. It will be appreciated that these are purely for exemplary and illustrative purposes and that alternative implementations may be envisaged within the scope of the present disclosure.

FIG. 5A illustrates a first exemplary postal identifier that comprises a first sequence 502. The first sequence is comprised of alphanumeric characters and comprises the identifying portion of the unique identifier. It will be appreciated that the first sequence may, itself, be subdivided into a plurality of sub-sequences.

Further, the first exemplary postal identifier comprises an origin indicator 504, which indicates the country of origin of the mail item. Additionally, the first exemplary postal identifier comprises a destination indicator 506, which indicates the destination country of the mail item.

FIG. 5B shows a second exemplary postal identifier that comprises a second sequence 508. Similarly to the first sequence 502, the second sequence serves as the identifying portion of the postal identifier. It will once again be appreciated that the second sequence may, itself, be comprised of a plurality of sub-sections.

The second exemplary postal identifier further comprises an origin indicator 504 that indicates the country of origin of the mail item. Additionally, the second exemplary unique identifier comprises a mail category indicator 510, which serves to indicate the type or category of the mail item (as discussed above).

Further, the second exemplary unique identifier comprises a check digit 512. As discussed above, check digits are commonly used for verification of the formatting and/or content of character sequences or codes.

It will be appreciated that the above exemplary postal identifiers have been presented purely for illustrative purposes. However, it should be appreciated that a number of alternative specific implementations of unique identifiers may be used.

Turning again to FIG. 3 and FIG. 4, in a third step 303, a second visual representation 410 of the portion of the mail item is obtained. The second visual representation may be obtained in any suitable fashion.

In an example, the step of obtaining the second visual representation 410 comprises using a second imaging component or device 412 to obtain an image of the portion of the mail item. The second imaging component may comprise any suitable or relevant features, components, elements or structures in order to obtain the image.

Any suitable imaging component may be used, including (without limitation): a camera component on a mobile phone; a camera component on a tablet; a camera component on a general computing device; a scanner; or a digital camera. In the present example, the second imaging component 412 is a camera component mounted in or affixed to a sorting or distribution unit (e.g., an automated sorting or distribution device).

Typically, the second imaging component is operated by a different entity than the first imaging component. In an example, the second imaging component is located in a distribution centre operated by a first carrier. In other examples, the second imaging component is operated by a third party (e.g., a verification services provider).

In a fourth step 304, a second postal identifier 413 is determined based on the second visual representation. The second postal identifier may be determined in any suitable manner and using a suitable methodology. In the present example, the second postal identifier is determined in substantially the same manner as the corresponding first unique identifier.

In a fifth step 305, the second postal identifier is compared with the first postal identifier. The comparison step may be carried out in any suitable manner using any suitable comparison method. It will be appreciated that the comparison step may be dependent on the format, encoding or other properties of one or both of the first unique identifier and the second unique identifier.

In an example, wherein the first postal identifier and the second postal identifier are stored as character sequences, it is possible to do a direct comparison between each character in the sequence. If all of the characters match, it can be concluded that the first unique identifier is identical to the second unique identifier.

The comparison step may be carried out by any suitable device 414, e.g., a mobile device, a server, or a personal computer. It will be appreciated that these are examples for illustrative purposes only, and that a plurality of devices suitable for performing the comparison step may be envisaged. The device may be operated by any suitable entity, e.g., (without limitation) a postal services provider; a logistics company; or a verification services provider. In an example, the device 414 is a different device than the device or device that carry out the preceding method steps. In an example, the device 414 carries out at least one of the preceding method steps. In some examples, the device 414 is operated by the same entity as an entity operating a device that carries out at least one of the preceding method steps. In some examples, the device 414 is operated by a different entity than the one or more devices carrying out the preceding method steps.

The comparison step effectively serves to verify the identity of the mail item. If successful the identity of the mail item is verified, the mail item can be cleared for processing and subsequent delivery to a recipient. In addition to verification of the identity of the mail item, one or more additional operations may be carried out as part of the comparison step. In some examples, as part of the comparison step, it is verified that relevant charges have been paid by the user. In some examples, one or both of the origin address and/or the recipient address are verified. In some examples, compliance of the mail item with a mail product specification (e.g., weight and dimensions of the mail item) is checked or verified.

These are, of course, only illustrative examples. It is possible that alternative or additional items that may be verified as part of the comparison step.

In the above, the exemplary method has been described in general terms. It will be appreciated that, as part of the above method, additional operational or processing steps may be carried out. Some of these will relate to standard data handling and transmission operations and will be well known to the skilled person. Others may relate to ancillary operations or processes that are carried out as part of, or in support of, one or more of the method steps described above (and in the following). Examples include encoding and encryption steps prior to transmission of data between two computer systems. Other examples include: data formatting or transformation steps; data clean-up operations; status or processing indicators or messages; or general data maintenance steps. The requirement and need for such steps would be appreciated by the skilled person, but for purposes of clarity and conciseness they are not discussed in the present disclosure. However, it will be understood that, even if not described in the above or in the following examples, such features or elements may nevertheless be present As an example of an additional step, the present method may in some examples further comprise a sixth step 306 of enabling further processing of the mail item based on a successful comparison step. It will be appreciated that the fifth step is carried out only in the event that the comparison is successful.

Further examples of additional steps will be described in the following.

Figure 6:
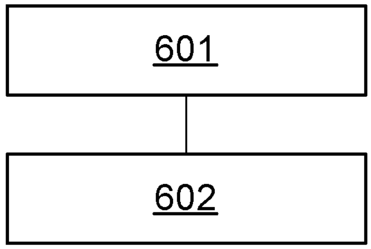
FIG. 6 illustrates an exemplary step of determining a first postal identifier in accordance with an embodiment of the present invention.
Figure 7:
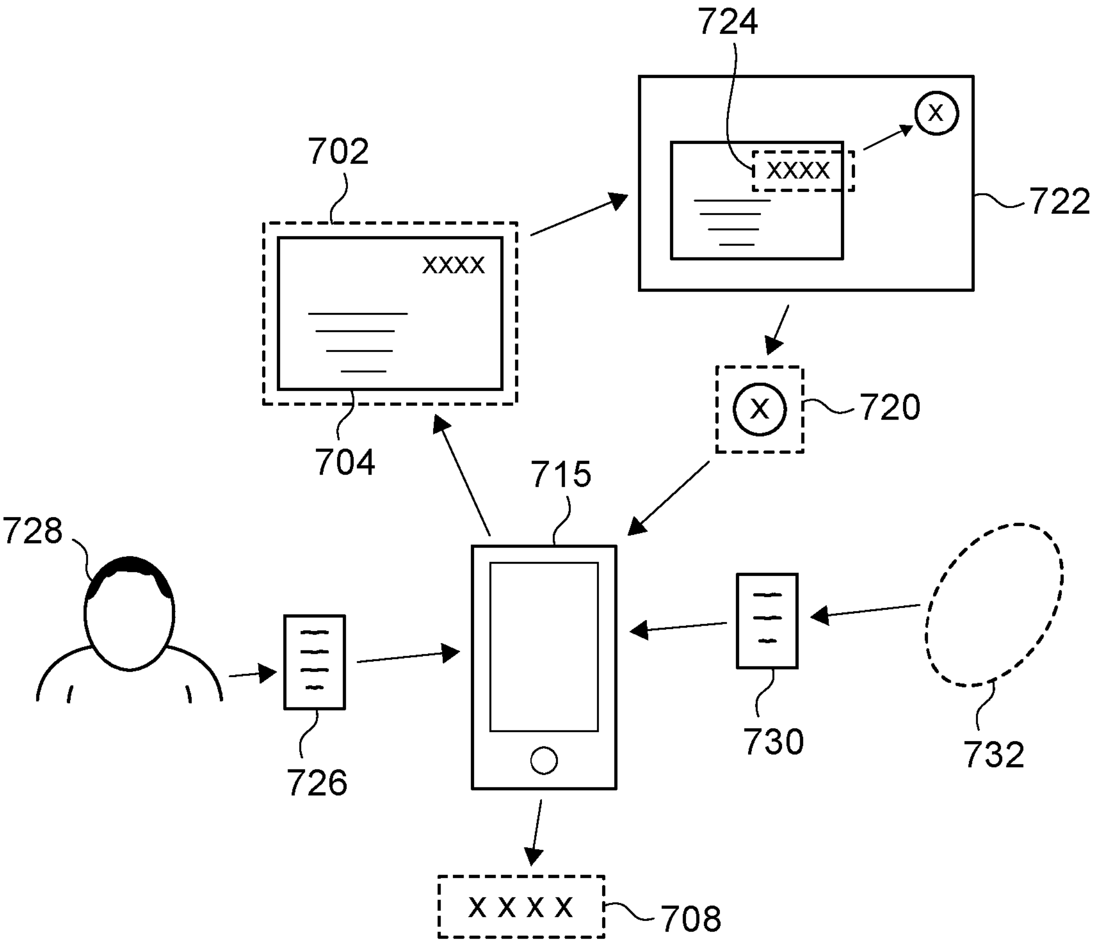
FIG. 7 shows schematically the exemplary step of FIG. 6.

An exemplary step of determining a first postal identifier in accordance with the present disclosure will now be discussed with reference to FIG. 6 and FIG. 7. This exemplary step may, for example, be implemented in the method described above with reference to FIG. 3 and FIG. 4. For ease of comparison with FIG. 4, elements of FIG. 7 similar to corresponding elements of FIG. 4 are labelled with reference signs similar to those used in FIG. 4, but with prefix "7" instead of "4".

In a first determining step 601, at least one first characteristic 720 is extracted from the first visual representation 702 of the mail item 704. Any suitable characteristic may be extracted from the first visual representation. Examples of the at least one first characteristic include, but are not limited to: image features; marks applied to the mail item; letters or symbols applied to the mail item; or other printed symbols or lettering.

The at least one first characteristic may be extracted in any suitable or relevant manner by a suitable extraction component 722. In some examples, the extraction is carried out by a processing component of a suitably configured device (e.g., a mobile phone, smart phone, tablet device, personal computer or server device). It will be appreciated that the manner of extracting the at least one first characteristic may, in some examples, depend on the properties of the at least one first characteristic to be extracted. Further, it will be appreciated that the manner of extracting the at least one first characteristic may be dependent on the type and properties of the extraction component.

In known systems, it is known to perform image analysis to recognise patterns or general features of the visual representation. Whilst this enables identification of mail items, there is a high risk of misidentification of mail items, as discussed above.

In the present example, the extraction step is performed by using one or more of: optical character recognition or intelligent character recognition on the first visual representation of the mail item. It is to be noted that the terms optical character recognition and intelligent character recognition cover a plurality of specific and related methodologies and technologies. In the interests of clarity and brevity, reference will in the following be made exclusively to intelligent character recognition (abbreviated in the following as 'ICR'), although it will be understood that this term may be used to refer to any of the aforementioned (or related) technologies and methodologies.

The extracting step may be performed on any suitable portion 724 of the first visual representation. In the present example, the extraction step is performed on substantially the entirety of the first visual representation of the mail item. This maximises the chance that the at least one first characteristic is successfully extracted, even if the user has marked the mail item in a non-standard, unusual or unexpected location.

In a second determining step 602, the first postal identifier 708 is generated based on the at least one first characteristic 720. The first postal identifier may be generated in any suitable manner.

In some examples, the first postal identifier comprises at least a portion of the at least one first characteristic. In some examples, the first postal identifier comprises substantially the entirety of the at least one first characteristic. Purely by way of example, if it is assumed that the at least one first characteristic comprises a sequence of characters or symbols, the first postal identifier may comprise some or all of the symbols or characters in the sequence.

In some examples, the first postal identifier comprises one or more additional sections, portions or subdivisions, each of which may comprise additional data or information. The additional data or information may be obtained from any suitable source and in any suitable manner. In some examples, the additional data comprises (without limitation): an indicator of the origin region of the mail item; an indicator of the origin country of the mail item; an indicator of the destination region of the mail item; an indicator of the destination country of the mail item; origin address of the mail item; destination address of the mail item; a service type of the mail item; or class designator for the mail item In some examples, the additional data comprises first additional data 726 obtained from a user 728 prior to the initiation of the method. Examples of such additional data include, but are not limited to: personal data; payment card details; bank details; origin address for the mail item; contact details for the user; or contact details for the recipient. In some examples, the method comprises one or more optional data gathering steps that are carried out prior to the commencement of the present method. For example, the method may comprise one or more user interaction steps during which the user provides data.

In some examples, the additional data comprises second additional data 730 that is obtained without specific input being required from the user. The second additional data may be obtained in a suitable manner by a suitable device, or component of a suitable device (e.g., by a user device 715 or remotely located device) The second additional data is gathered from a suitable source 732, including (but not limited to): external databases; sensors or detectors forming part of or connected to the device; or other information providing services. Examples of such automatically collected additional data include, without limitation: location data; or other data from which the location of the device may be determined; or device-related data. In some examples, the user may be required to give consent to such data being obtained, but once consent has been given, the data may be collected automatically without further user input.

In the above, the extracting and generating steps have been described in general terms. It will no doubt be appreciated that numerous methodologies for extracting the at least one first characteristic and subsequent generation of the first unique identifier are possible. Purely for illustrative purposes a number of non-limiting exemplary specific extraction steps will now be described.

Figure 8A:
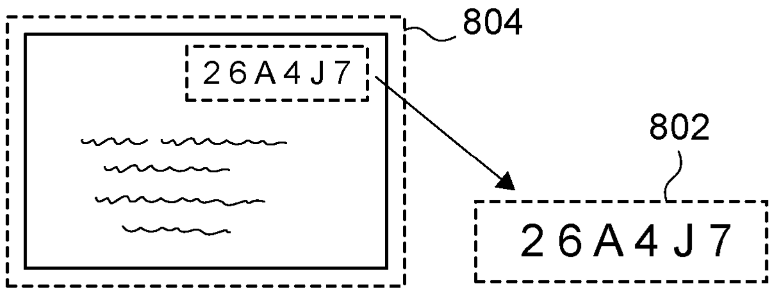
FIG. 8 illustrates schematically a number of exemplary extraction steps in accordance with an embodiment of the present invention.

A first exemplary extracting step in accordance with the present disclosure, which may be implemented in the above exemplary method, will now be discussed with reference to FIG. 8A.

In the present example, a first identifier 802 is extracted from the first visual representation 804 of the mail item. The first identifier may comprise any suitable combination of: numerals; digits; characters; letters; symbols; graphemes; syllabograms; or glyphs. In some examples, the first identifier comprises a first generated sequence of characters. In some examples, the first identifier comprises a first generated sequence of digits. In other examples, the first identifier comprises one of a plurality of predetermined sequences of characters. In some examples, the first identifier comprises one of a plurality of predetermined sequences of digits.

In the present example, the first identifier comprises a first generated sequence of alphanumeric characters.

In the present example, the first identifier comprises 6 characters. It will however be understood that the first identifier may comprise any suitable plurality of characters. The first identifier, in some examples, comprises at least 2 characters; optionally at least 3 characters; optionally at least 4 characters; optionally at least characters; optionally at least 6 characters; optionally at least 7 characters; optionally at least 8 characters; optionally at least 9 characters; optionally at least characters; optionally at least 11 characters; optionally at least 12 characters; optionally at least 13 characters; optionally at least 14 characters; optionally at least 15 characters; optionally at least 16 characters; optionally at least 17 characters; optionally at least 18 characters; optionally at least 19 characters; optionally at least 20 characters.

The first identifier may have any suitable form, encoding, encryption or set of properties.

The first identifier may be applied to the mail item by the user prior to the commencement of the present method, for example as part of the user applying the recipient address to the mail item. The user may, for example, write the first identifier on the mail item in the place where a traditional stamp would otherwise have been placed.

The first identifier may be generated in any suitable manner using a suitable generation method. In some examples, the first identifier is comprised of a randomly generated sequence of alphanumeric characters. Any suitable number of random character generators may be used for this purpose. In some examples, the first identifier is generated based on one or more specific requirements or criteria, such as (without limitation): formatting requirements; or symbols or characters to be avoided. In some examples, the first identifier is generated based least partially on one or more starting values or parameters. Examples of such values or parameters include (but are not limited to): origin country; current date; portions of origin address; a user-related identifier; a user device-related identifier; or a seed variable.

In some specific examples, the first identifier is generated based on one or more of: class, designation or type of the mail item; postal code of origin; country of origin; recipient postal code; recipient country; or one or more physical characteristics of the mail item.

By using one or more parameters or characteristics to generate the first identifier, the first identifier can be kept as short as possible whilst maintaining a sufficient length to ensure that the mail item can be uniquely identified. Ensuring that the first identifier is as short as possible, since this renders it easier, quicker and more convenient for a user to apply the first identifier to a mail item. Purely by way of example, certain origin postal codes may generally have a higher volume of mail items being sent (for example if the origin postal code is in a busy location). In such circumstances, it may be necessary to lengthen the first identifier compared to postal codes with a lower volume of mail items. Alternatively or additionally, it may be necessary to enable the use of addition character types (e.g., by switching from digits only to alphanumeric characters).

In some examples, one or more additional data elements are generated in addition to the first identifier. In some examples, additional data is used during processing of the first identifier, the first postal identifier; or the mail item more generally. In an example a first postal identifier expiry timestamp is generated as part of the first identifier generation process. This first identifier expiry timestamp is, in some examples, used by one or more components, elements or systems on which the exemplary method is implemented to verify whether the first identifier has been utilised within a prescribed period. In other words, once generated, the first identifier must be used within a specified period of time, after which it expires and is rendered unusable. For example, once generated, the user must apply the first identifier to the mail item, obtain the first visual representation of the mail item and the first postal identifier must be determined within a specified period of time. The first identifier expiry timestamp, in other examples, is used during the comparison step. This will be described in more detail below.

The first identifier may be generated at any suitable point in time as part of the present method. An example of the generation step as part of the wider method will be discussed in more detail below.

Figure 8B:
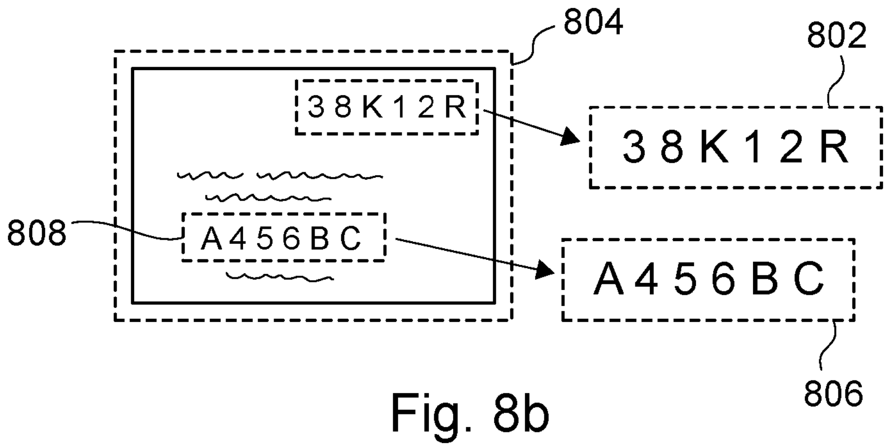

A second exemplary extracting step in accordance with the present disclosure, which may be implemented in the above exemplary method, will now be discussed with reference to FIG. 8B.

In this example, a first identifier 802 is extracted from the first visual representation 804 of the mail item, the identifier comprising a first generated sequence of alphanumeric characters (similarly to the preceding example). The first identifier may be extracted in any suitable manner. In the present example, the first identifier is extracted in a manner consistent with that described with reference to FIG. 8A above.

In this example, the extracting step further comprises extracting a second identifier 806 from the first visual representation, wherein the second identifier comprises at least a portion of a recipient address. The second identifier may comprise any suitable or advantageous portion of the recipient address. In an example, the second identifier comprises at least a portion of a recipient postal code 808. In a specific example, the second identifier comprises the entirety of the recipient postal code.

In this example, both of the first identifier 802 and the second identifier 806 are used to subsequently generate the first postal identifier. The first identifier and the second identifier may be combined in any suitable manner to generate the first postal identifier. In some examples, additional data is used to generate the first postal identifier in a manner substantially similar to that described with reference to FIG. 8A above. In an example, the first identifier and the second identifier are conjoined to create an identifying portion of the first postal identifier. In a specific example, the generated first postal identifier is substantially identical to the first postal identifier discussed above with reference to FIG. 5A.

Figure 9:
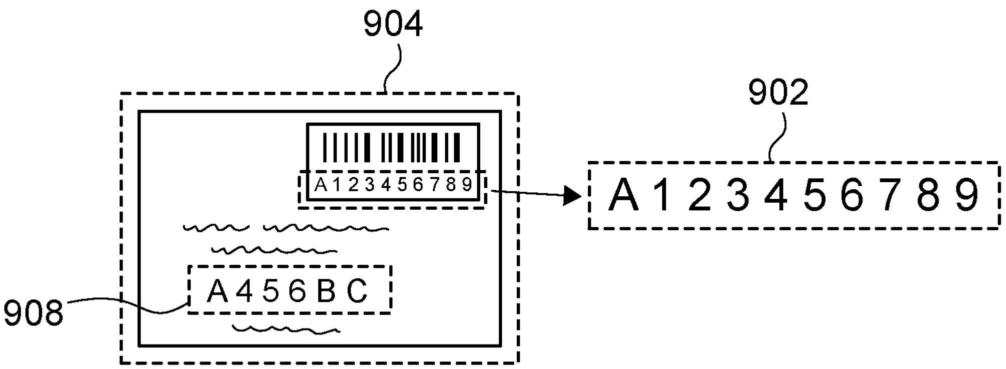
FIG. 9 illustrates schematically a further exemplary extraction step in accordance with an embodiment of the present invention.

A third exemplary extracting step in accordance with the present disclosure will now be discussed with reference to FIG. 9.

In this example, a first identifier 902 is extracted from the first visual representation 904, the first identifier comprising one of a plurality of predetermined sequences of alphanumeric characters. The predetermined sequences may be determined in any suitable manner and using a suitable means. For purposes of the present disclosure it is sufficient to note that the plurality of predetermined sequences are provided to the user in a suitable form.

In an example, the plurality of predetermined sequences are provided in the form of a plurality of barcodes. In the present example, the plurality of barcodes are provided on a suitable medium, e.g., a roll of individual stickers, each of which is provided with one barcode. When the user needs to post or ship a mail item, a sticker provided with a predetermined sequence can be removed from the roll and affixed to the mail item.

It should be noted that whilst described as barcodes, this is merely exemplary and entirely non-limiting. The plurality of predetermined sequences may, in principle be provided in any form detectable by the ICR system.

In some examples, additional data is used in addition to the first identifier to generate the first postal identifier. In some examples, additional data is used to generate the first postal identifier in a manner substantially similar to that described with reference to FIG. 8A above. In an example, the generated first postal identifier is substantially identical to the first postal identifier discussed above with reference to FIG. 5B.

In some examples, the extracting step further comprises extracting a second identifier 806 from the first visual representation, wherein the second identifier comprises at least a portion of a recipient address. The second identifier may comprise any suitable or advantageous portion of the recipient address. In an example, the second identifier comprises at least a portion of a recipient postal code 808. In a specific example, the second identifier comprises the entirety of the recipient postal code. In an example, the second identifier is used to generate the first postal identifier.

In other examples, the second identifier is not used to directly generate the first postal identifier, but is used as additional data. The second identifier, in such examples, may be used as additional identifying data that can be transmitted to any relevant entities alongside the first postal identifier.

In the above, the exemplary methods have been described in general terms. It will be appreciated that additional or optional features and method steps may be implemented as part of the present disclosure. A number of these additional or optional steps will now be described in more detail.

In some examples, additional operations are performed in relation to the first postal identifier subsequently to the step of determining the first postal identifier. Whilst the above examples provide a method for verifying the identity of a mail item, it may in some circumstances be beneficial to further reduce the risk of fraudulent or unauthorised behaviour by any third parties.

This can, for example, be accomplished by suitably activating the first postal identifier. In such examples, the first postal identifier cannot be used to indicate payment of postage of shipment fees prior to activation. Further, it cannot, in such examples, be used to identify the mail item. This prevents unauthorised third parties from fraudulently predicting and applying first postal identifiers to mail items. In some examples, the method described above with reference to FIG. 3 and FIG. 4 further comprises a step of activating the first postal identifier. This step may be carried out at any suitable time and by a suitable device or entity. In some examples, the step of activating is carried out subsequently to the step of determining the first postal identifier.

In some examples, the step of activating comprises associating the first postal identifier with at least one additional identifying data element. In certain examples, one or more of the additional data referred to in some of the above examples are additionally associated with the first postal identifier.

Figure 10:
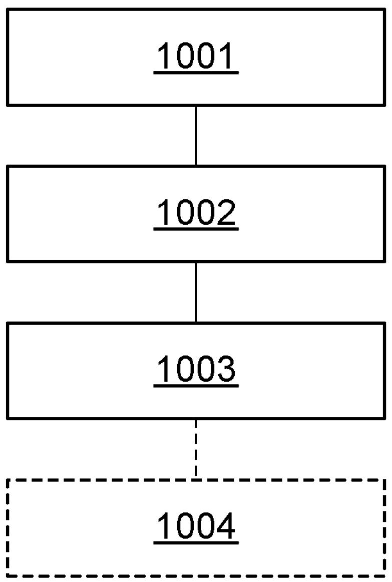
FIG. 10 illustrates an exemplary activation step in accordance with an embodiment of the present invention.
Figure 11:
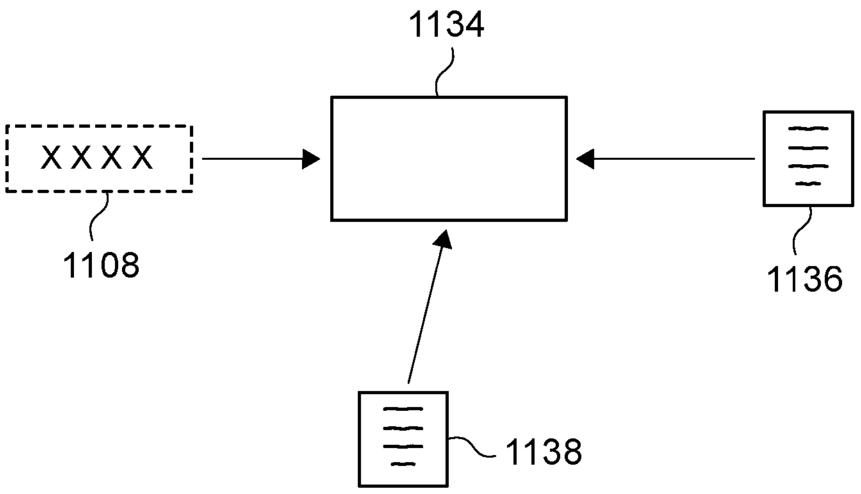
FIG. 11 shows schematically the exemplary step of FIG. 10.

Purely for exemplary purposes, an activation step will now be described with reference to FIGS. 10 and 11. This exemplary step may, for example, be implemented in the method described above with reference to FIG. 3 and FIG. 4. For ease of comparison previous Figures, elements of FIG. 11 similar to corresponding elements of previous Figures are labelled with reference signs similar to those used in these Figures, but with prefix "11". Furthermore, for purposes of conciseness and clarity, only features and elements that differ substantially from corresponding features and elements described above will be discussed in detail in the following.

In a first step 1001, a first mail item record 1134 is created. The first mail item record may have any suitable format and may be created in a suitable manner. In the present example, the first mail item record is a suitable container that may be transmitted in a secure manner from the device wherein it is created to a second device in which further operations may be carried out.

In a second step 1002, the first postal identifier 1108 is added to the first mail item record 1134. The first postal identifier may have any suitable or relevant format. In some examples, the first postal identifier is substantially as described in one of the above examples.

In a third step 1003, at least one additional identifying data element 1136 is added to the first mail item record 1134. Any suitable or relevant additional identifying data element may be added to the first mail item record. In some examples, a plurality of additional identifying data elements are added to the first mail item record.

The additional identifying data element may be used in subsequent operations to facilitate the comparison and verification processes.

As described above, whilst the first postal identifier 1108 provides a level of protection against fraudulent or unauthorised used, using additional identifying data elements provides an additional layer of security. Additionally, the additional identifying data elements provide additional data points that can be used during the comparison step.

For example, it is possible that the second visual representation or the second postal identifier contain one or more errors. There is, therefore, a risk that no match is found during the comparison step, or that an erroneous match is found.

To mitigate this risk, it is possible to use the at least one additional identifying data element to verify the result of the comparison step. This will be described in more detail in the following.

In a fourth optional step 1004, at least one additional data element 1138 is added to the first mail item record 1134. Any suitable or relevant additional data element (or elements) may be added. Such additional data elements may contain information or data that is relevant to the first mail item record, but which is not used to identify the mail item.

In some examples, the at least one additional data element comprises a time stamp (not shown). In a specific example, the time stamp comprises the first identifier expiry time stamp described with reference to FIG. 8A above. In another specific example, the time stamp comprises a postal identifier time stamp that is generated simultaneously with the first postal identifier.

In some examples, the at least one additional data element comprises a first status flag associated with the first postal identifier. The first status flag may be used to indicate any suitable or relevant status. In some examples, the first status flag is used to indicate the processing status of the first postal identifier.

The status flag can be updated at relevant points during the method. For example, when the first postal identifier and the at least one additional identifying data element have been added to the first mail item record, the status flag can be set to 'ACTIVATED'.

Figure 3:
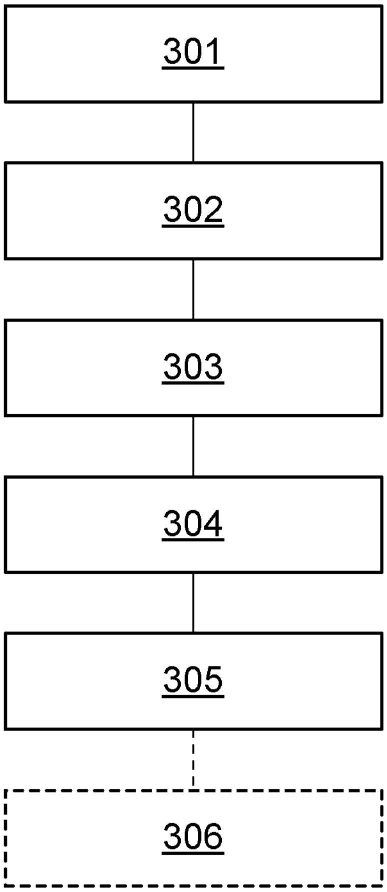
FIG. 3 illustrates a method in accordance with an embodiment of the present invention.
Figure 4:
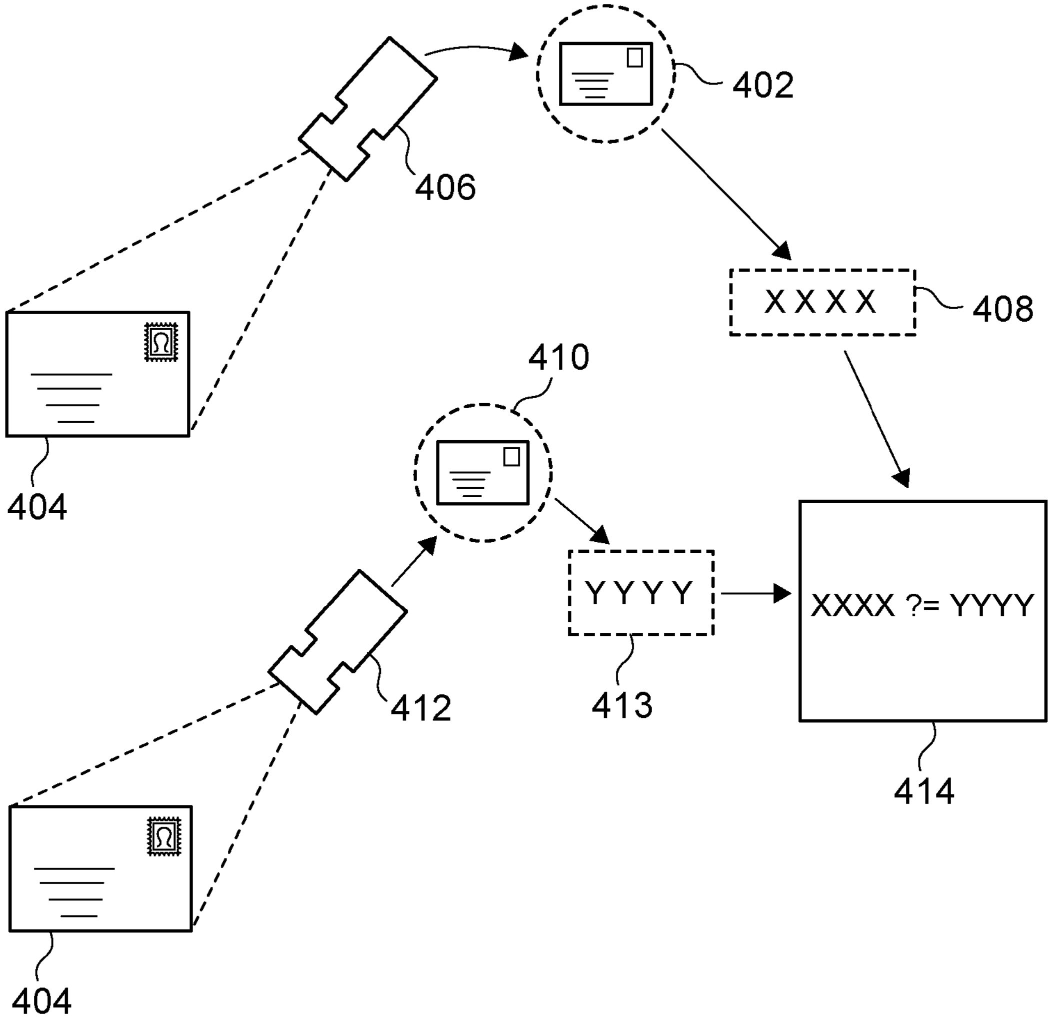
FIG. 4 illustrates schematically the exemplary method of FIG. 3.

Purely by way of example, the status flag can be used during the comparison step, such as for example described with respect to FIG. 3 and FIG. 4 above. In this example, if a match is detected between a second postal identifier and a first postal identifier, the status flag for the first postal identifier is checked. If the status flag is set to 'ACTIVATED', the comparison step is determined to be successful and the mail item is cleared for processing.

It will be appreciated that the above example is purely for illustrative purposes. The use of the status flag will be described in more detail in the following.

It will be appreciated that the above-described additional identifying data element 1136 and additional data element 1138 may, in some examples, be partly or wholly identical to the additional data elements 726 and 730 described with reference to FIG. 7.

It will be appreciated that, as described in the present example, the first mail item record may be considered as only being a data container for the first postal identifier, it can be implemented as such in the preceding examples. In such examples, the first mail item record is substantially analogous to the first postal identifier in the preceding examples.

However, as described above, by adding additional data elements to the first mail item record, it becomes possible to increase the efficacy of the exemplary methods. An exemplary comparison step will now be described with reference to FIGS. 12 and 13. For ease of comparison previous Figures, elements of FIG. 13 similar to corresponding elements of previous Figures are labelled with reference signs similar to those used in these Figures, but with prefix "13". Furthermore, for purposes of conciseness and clarity, only features and elements that differ substantially from corresponding features and elements described above will be discussed in detail in the following.

In a first step 1201, a first entry 1340 is created in a record of activated mail items 1342 based at least on the first postal identifier 1308.

The record of activated mail items may be implemented in a suitable manner. In some examples, the record is implemented as a database wherein each entry has a relevant number of parameters, variables or characteristics.

In a second step 1202, the second postal identifier 1313 is matched to the record of activated mail items 1342. The matching step may be carried out in any suitable manner and by a suitable device 1314. A number of specific implementations of the matching step may be envisaged within the scope of the present disclosure.

In some examples, a number of additional steps may be comprised in the comparison step. A number of these will be described in the following, some or all of which may be comprised in the comparison step.

In a first optional step 1203, prior to step 1201, a first mail item record is received 1334. The first mail item record may have any suitable properties and may comprise any suitable and/or relevant information or data. In the present example, the first mail item is substantially identical to the exemplary first mail item record described above with reference to FIG. 11. The first mail item record may be received by any suitable device or entity. In some examples, the first mail item record is received by the same device or entity that performs the comparison step. In other examples, the first mail item record is received by a different device or entity than the one that performs the comparison step.

The first mail item record may be received at any point prior to the performance of the matching step 1202.

As described in the preceding examples, the first mail item comprises the first postal identifier 1308; at least one additional identifying data element 1336; and at least one additional data element 1338.

In the present example, the at least one additional data element comprises a status flag 1339 that indicates a status of the first postal identifier. On receipt of the first mail item record, the status flag is set to 'ACTIVATED' since the status flag is set to this status during the activation process carried out at a user device (not shown).

In a second optional step 1204, the first postal identifier 1308 is extracted from the first mail item record 1334. The first postal identifier may be extracted in any suitable manner. It will be appreciated that the extraction step may be dependent on the format, encoding, encryption or other properties of the first mail item record.

The first postal identifier 1308 may have any suitable or relevant format. In some examples, the first postal identifier is substantially as described in one of the preceding examples.

In a third optional step 1205, one or more of the at least one additional identifying data element 1336 is extracted from the first mail item record 1334 and is added to the first entry 1340. In some examples, all such elements are extracted from the first mail item record.

The extraction may be carried out in a suitable manner. Similarly to the preceding step, it will be appreciated that the extraction step may be dependent on the format, encoding, encryption or other properties of the first mail item record. In the present example, a copy 1336A of the at least one additional identifying data element is added to the first entry 1340.

In a fourth optional step 1206, one or more of the at least one additional data element 1336 is extracted from the first mail item record and added to the first entry 1340. In some examples, all such elements are extracted from the first mail item record.

The extraction may be carried out in a suitable manner. Similarly to the preceding step, it will be appreciated that the extraction step may be dependent on the format, encoding, encryption or other properties of the first mail item record. In the present example, a copy 1338A of any additional data elements except the status flag is added to the first entry 1340. The status flag comprised in the first mail item record is used to modify a first entry status flag 1344. The first entry status flag, in some examples, is substantially a copy of the status flag 1339. In some examples, the first entry status flag 1344 comprises additional statuses to the status flag 1339. In such examples, the status flag is merely used to correctly update the first entry status flag.

It will be appreciated that, although described as separate method steps, some or all of the steps 1204, 1205 or 1206 may be performed substantially simultaneously and as part of a single operational step. For example, the first mail item record may be a single data container from which all of the data can be extracted in a single operation.

In a fifth optional step 1207, following the matching step 1202, the first entry 1340 in the record of activated mail items 1342 is modified based on the second postal identifier being detected in the record of activated mail items. The first entry may be modified in any suitable manner.

In some examples, the step of modifying comprises removing the first entry 1340 from the record of activated mail items 1342. In some examples, the step of modifying comprises modifying at least one of the data elements 1336A, 1338A, 1344 comprised in the first entry. In some examples, the step of modifying comprises adding a status flag to the first entry 1342. In some examples, the step of modifying comprises altering the status flag 1344 comprised in the first entry.

In the present example, the status flag 1344 is modified by setting it to MATCHED', which indicates that a match between the first postal identifier and a second postal identifier has been found.

By suitably modifying the first entry based on a successful match, any further mail items carrying a second postal identifier 1313 that matches the first postal identifier 1308 can be appropriately dealt with. Typically, this may result in the further mail item not being processed. In some situations, a decision may be made whether to process the further mail item by a relevant entity (e.g., the first carrier). This could, for example be to take into account special circumstances.

In a sixth optional step 1208, the first entry is modified based on one or more criteria being met. Any suitable criteria may be set. In some examples, the one or more criteria comprises expiry of a validity period based on a time stamp associated with the mail item. In an example, the one or more criteria comprises expiry of a validity period based on the first identifier expiry time stamp. In some examples, the one or more criteria comprises a result of the comparison step.

In some examples, the step of modifying comprises removing the first entry. In some examples, the step of modifying comprises adding a status flag to the first entry. In some examples, the step of modifying comprises altering a status flag in the first entry.

In the present example, the first entry 1340 is modified by setting the status flag 1344 to 'EXPIRED' based on expiry of a validity period based on the first identifier expiry time stamp. Once the status flag has been set to 'EXPIRED', similarly to when the status flag has been set to 'MATCHED', any further mail items carrying a second postal identifier that matches the first postal identifier can be appropriately dealt with. Typically, this may result in the further mail item not being processed. In some situations, a decision may be made whether to process the further mail item by a relevant entity (e.g., the first carrier). This could, for example be to take into account special circumstances.

In some examples, a removal time stamp (not shown) may be added to any entries in the record of activated mail items 1342 that have the status 'MATCHED' or 'EXPIRED'. Once a predetermined period is elapsed, the relevant entries are removed, archived or otherwise rendered inactive from the record of activated mail items. It will be appreciated that a number of specific implementations of this may be envisaged, said implementations being dependent on the properties of the system on which it is implemented.

Removal of entries allows for the first identifiers associated with the first postal identifier of the mail item to be reused. As discussed above, the first identifier is intended to be convenient for a user to apply to a mail item, and will typically contain only a limited number of characters. Given these constraints on the first identifiers and given the volume of mail items that pass through some distribution systems, there is a risk that first postal identifiers may be repeated given enough time. By deleting the entries after a certain period, it can be prevented that a subsequent legitimate use of a first postal identifier is falsely labelled as fraudulent, while preventing fraud from happening for a certain period after the first mail item is processed.

Figure 14:
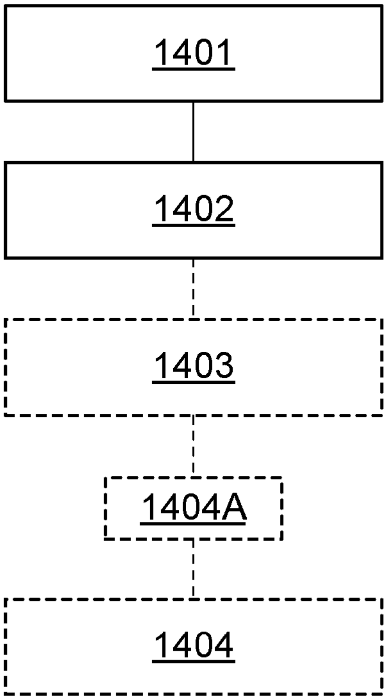
FIG. 14 shows an exemplary step of determining a second postal identifier in accordance with an embodiment of the present invention.

In the above, the step of determining a second postal identifier has been discussed in general terms. An exemplary step of determining a second postal identifier in accordance with the present disclosure will now be discussed in more detail and with reference to FIG. 14. The exemplary step of determining a second postal identifier may be implemented in conjunction with any of the method steps described above. For purposes of conciseness and clarity, only features and elements that differ substantially from similar or corresponding features and elements described above will be discussed in detail in the following.

In the present example, the step of determining a second postal identifier comprises a first step 1401 of extracting at least one second characteristic from the second visual representation, the at least one second characteristic corresponding to the at least one first characteristic. It will be appreciated that this is exemplary only, and that any suitable second characteristic that corresponds to the at least one first characteristic may be extracted from the second visual representation.

The at least one second characteristic may be extracted in any suitable fashion and using a suitable methodology. In the present example, the at least one second characteristic is extracted in substantially the same manner as the corresponding at least one first characteristic.

In a second step 1402, a second postal identifier is determined based on the at least one second characteristic. The second unique identifier may be determined in a suitable manner by a suitable component or element.

In the present example, the second postal identifier is determined in substantially the same manner as the corresponding first postal identifier.

In the above example, a record of activated mail items is discussed. However, in principle, a similar functionality can be achieved by using a record of processed or expired mail items. For conciseness purposes, such an implementation will not be discussed in detail, but an exemplary implementation will be discussed. It will be appreciated that other implementations could be envisage within the scope of the present disclosure. It will also be appreciated that the following example may be implemented in conjunction with some or all of the examples discussed above.

In one such example, the step of determining a second postal identifier comprises a first optional step 1403, wherein the second postal identifier is compared with a list of processed postal identifiers. If the second postal identifier is detected within the list of processed identifiers, it is determined that the second postal identifier has already been legitimately processed. It can therefore be concluded that the second postal identifier is being fraudulently used. The mail item carrying the fraudulent second unique identifier can therefore be prevented from further processing. Optionally, the user, the first carrier or a relevant third party may be notified of the attempted fraud. In such circumstances, the user, first carrier or the relevant third party may in some cases choose to take an appropriate action based on the circumstances.

In a second optional step 1404, which is carried out subsequent to a successful match between the first and second postal identifier (highlighted by reference numeral 1404A, the second postal identifier is added to the list of processed identifiers. In some examples, additional data or information is added to the list of processed identifiers, such as (but not limited to) time stamps; country of origin; recipient country; time stamps, status flags or other information relating to the mail item.

In some examples, some or all of the data in the list of processed identifiers is used for additional methods and checks. In some examples, some or all of the data may be used as part of maintenance operations on the list of processed identifiers.

In addition to the features and steps described in the above examples, it will be appreciated that a number of optional or additional steps or features may be envisaged within the scope of the present disclosure.

In some examples, the method described above with reference to FIG. 3 and

Figure 15:
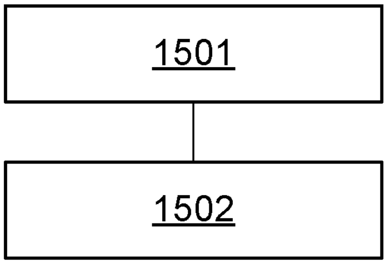
FIG. 15 shows an exemplary user interaction step in accordance with an embodiment of the present invention.

FIG. 4 comprises a user interaction step, an example of which will now be described in more detail with reference to FIG. 15. The interaction step may be carried out at any suitable time, but in some examples is performed prior to the step of obtaining a first visual representation of a portion of the mail item.

The user may use any suitable device for performing the interaction step, including (but not limited to): a mobile phone; a smart phone; a tablet device; a laptop computer; a desktop computer; or other computing device. For purposes of the following steps, reference is made to a user device. It will be understood that while the term user device may typically refer to a mobile device (e.g., a smart phone or a tablet device), it will be appreciated that any one of the above devices could equally well be used.

In a first step 1501, a user enters postal information relating to the mail item in a relevant manner (e.g., by typing or selecting information by way of a user interface of the user device). In an example, the user enters information relating to the intended type or class of the mail item.

In a second step 1502, one or more physical properties or characteristics of the mail item is obtained. Any suitable or relevant physical properties or characteristics of the mail item may be obtained in a suitable manner.

In some examples, the physical dimensions of the mail items are obtained. This may be performed in any suitable manner. For example, in some mobile devices, it is possible to determine dimensions of objects based on information obtained by way of one or more sensors located in the mobile device. Specifically, some mobile devices can determine dimensions based on images obtained by way of a device-mounted imaging component (e.g., a camera on a mobile phone). A number of specific methodologies exist for implementing this, and in the interest of brevity no further detailed discussion of this feature will be made in the present disclosure.

In some examples, the weight of the mail item, either in addition to the physical dimensions or as an alternative to the physical dimensions, is obtained during the second step. The weight may be obtained in any suitable manner and by way of a suitable device. In some examples, a device or sensor element external to the user's device may be used. In some examples, the weight of the mail item is determined using a one or more sensors located in the user device. In a specific example, the weight of the mail item is determined by way of a capacitive touch sensor located in proximity to the screen of the user device. In another specific example, the weight of the mail item is determined by way of a suitable weighing device that is connected to the user device (e.g., a set of digital scales connected to the user device).

The obtained physical properties or characteristics may subsequently be used to carry out one or more other operations. For example, the physical dimensions and/or weight of the mail item may determine what types of mail service is appropriate or available to the user. Further, in some examples, one or more of the obtained physical properties or characteristics are added to the first unique identifier. In other examples, one or more of the obtained physical properties or characteristics are provided in addition to the first unique identifier.

Figure 16:
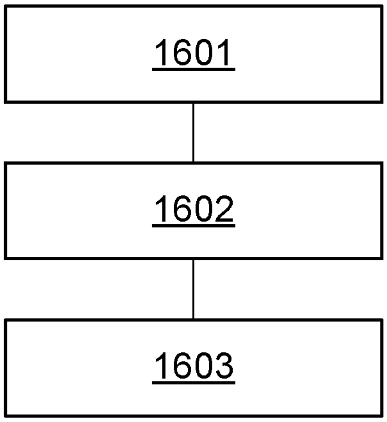
FIG. 16 illustrates an exemplary additional verification step in accordance with an embodiment of the present invention.

In some examples, additional verification to the above-described steps may be advantageous or required. One such exemplary additional verification step will now be described with reference to FIG. 16. Whilst referred to as an additional verification step, it will be appreciated that this step may, itself, comprise a number of sub-steps. In the present example, each of the sub-steps will be described in more detail below. This exemplary additional verification step may, for example, be implemented in addition to any of the method steps described in the preceding examples.

In a first step 1601, a first set of visual features of the first visual representation are identified. Any suitable set of visual features may be identified using any suitable identification method or algorithm. In some examples, the first set of visual features comprises a plurality of unique and/or identifying features of the first visual representation of the mail item.

In a second step 1602, a second set of visual features of the second visual representation are identified. Whilst any suitable set of visual features may be identified using a suitable identification method or algorithm, the specific method used will be the same as the one used to identify the first set of visual features.

In a third step 1603, the first set of visual features are compared to the second set of visual features. Any suitable comparison methodology may be used.

By using an additional comparison step, in addition to the above-described comparison steps, the risk of misidentified mail items may be reduced. In some examples, the additional comparison step is performed for each mail item. In some examples, the additional comparison step is only performed for mail items that may have been misidentified.

Purely by way of example, if a discrepancy or an anomaly is discovered during the determination steps for either or both of the first or second postal identifiers (e.g., if a check digit is not correct), the present exemplary additional verification step may be carried out. The result of this additional verification step will reduce the number of instances wherein a mail item is misidentified and processed incorrectly.

Further, the additional verification step may reduce instances of fraud since, even if the first postal identifier is copied by an unauthorised third party, it is highly likely that the visual features of the fraudulent mail item will differ from the authorised mail item.

Figure 17:
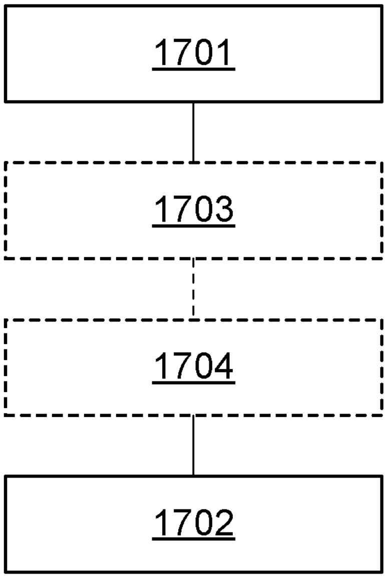
FIG. 17 shows a method for a user device in accordance with an embodiment of the present invention.
Figure 18:
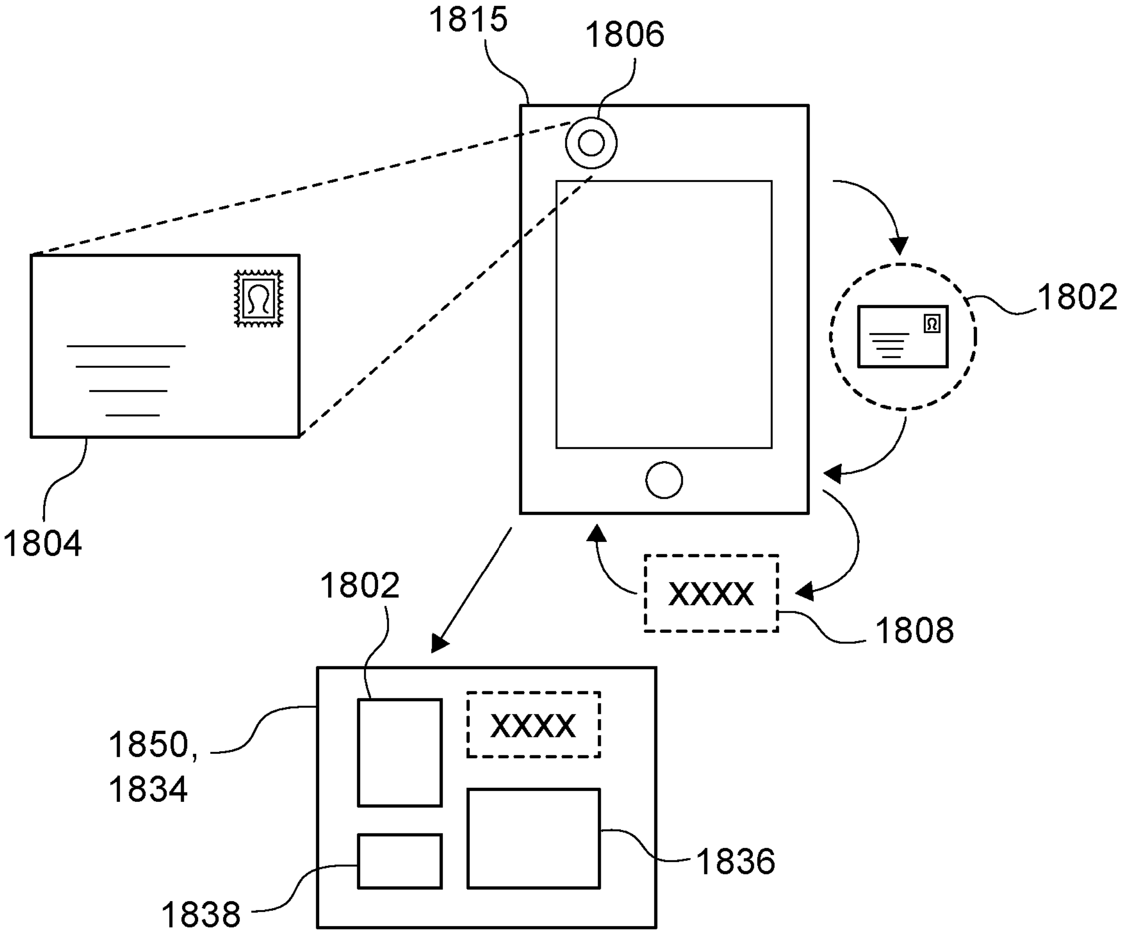
FIG. 18 illustrates schematically the method of FIG. 17.

A method for a user device in accordance with the present disclosure will now be described with reference to FIGS. 17 and 18. For ease of comparison previous Figures, elements of FIG. 18 similar to corresponding elements of previous Figures are labelled with reference signs similar to those used in these Figures, but with prefix "18". Furthermore, for purposes of conciseness and clarity, only features and elements that differ substantially from corresponding features and elements described above will be discussed in detail in the following.

In a first step 1701, a first visual representation 1802 of at least a portion of a mail item 1804 is obtained. The first visual representation may be obtained in any suitable manner. The first visual representation may have any suitable format.

Further, the first visual representation may have a suitable or relevant encryption or encoding.

In some examples, the first visual representation is obtained by using a first imaging component or device 1806 to obtain an image of the portion of the mail item. Any suitable imaging component or device may be used, including (without limitation): a camera component on a mobile phone; a camera component on a tablet; a camera component on a general computing device; a scanner; a digital camera. In the present example, the first visual representation is obtained by using a camera on user device 1815 belonging to or operated by a user.

The obtained image may have a suitable format and encoding. In some cases, the format and/or encoding of the obtained image is dependent on one or more of: the hardware of the device; the firmware or operating system installed on the device; any applications required to operate the imaging component.

In some examples, the first visual representation 1802 comprises additional data, the additional data comprising one or more of: a time stamp; location data; mail item data; user-related data; or user device data.

In a second step 1702, a first data packet 1850 is transmitted to a remote device (not shown), the first data packet comprising first data associated with at least the first visual representation 1802. The first data packet may comprise any suitable or relevant first data associated with the first visual representation, including (but not limited to): the first visual representation; data derived from the first visual representation (e.g., a first postal identifier); additional data elements associated with the second visual representation; additional data elements associated with the user or user device; or additional data elements associated with sensor data obtained from one or more sensors connected to or forming part of the user device.

The exemplary method may, in some examples, comprise additional steps, some of which will be described for illustrative purposes below. It will be appreciated that these are purely for exemplary purposes, and that alternative steps may be envisaged within the scope of the present disclosure. Further, it will be appreciated, that, whilst disclosed as carried out on the user device, some of the below steps may, in principle, be performed on a different device (e.g., a remotely located computing device).

In the present example, the method comprises a third step 1703, in which a first postal identifier 1808 is determined based on the first visual representation 1802, and in which the first postal identifier is added to the first data packet 1850. The first postal identifier may be determined in any suitable manner. In some examples, the first postal identifier is determined in a manner such as is described in one of the preceding examples. In a specific example, the first postal identifier is determined in a manner identical to that described with reference to Figure and FIG. 4. In another specific example, the first postal identifier is determined in a manner identical to that described with reference to FIG. 6 and FIG. 7. For the sake of conciseness of the present disclosure, the step of determining the first postal identifier will not be discussed in more detail in the present example.

In the present example, the method further comprises a fourth step 1704 of activating the first postal identifier 1808. The step of activating may comprise associating the first postal identifier with at least one additional identifying data element 1836. The at least one additional identifying data element may comprise one or more of a: time stamp; validity period indicator; origin postal code; destination postal code; origin country code; destination country code; address of origin; destination address; payment confirmation; payment status; user identifier;

recipient identifier; service type of the mail item; or class designator for the mail item.

The step of associating the first postal identifier may comprise creating a first mail item record 1834, wherein the first mail item record comprises the first postal identifier and the at least one additional identifying data element. The first mail item record may comprise a plurality of additional identifying data elements 1838.

In some examples, the first mail item record is comprised in the first data packet 1850. In some examples, the first data packet is comprised substantially entirely of the first data packet.

Figure 19:
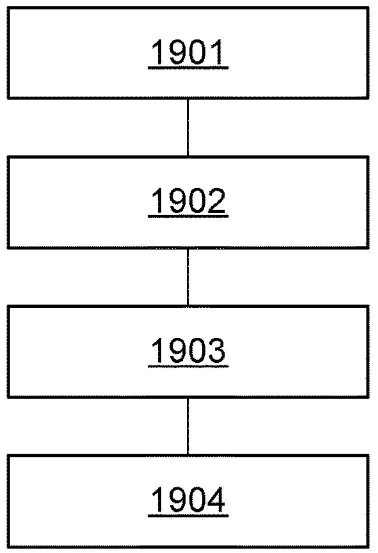
FIG. 19 shows a method for a computing device in accordance with an embodiment of the present invention.
Figure 20:
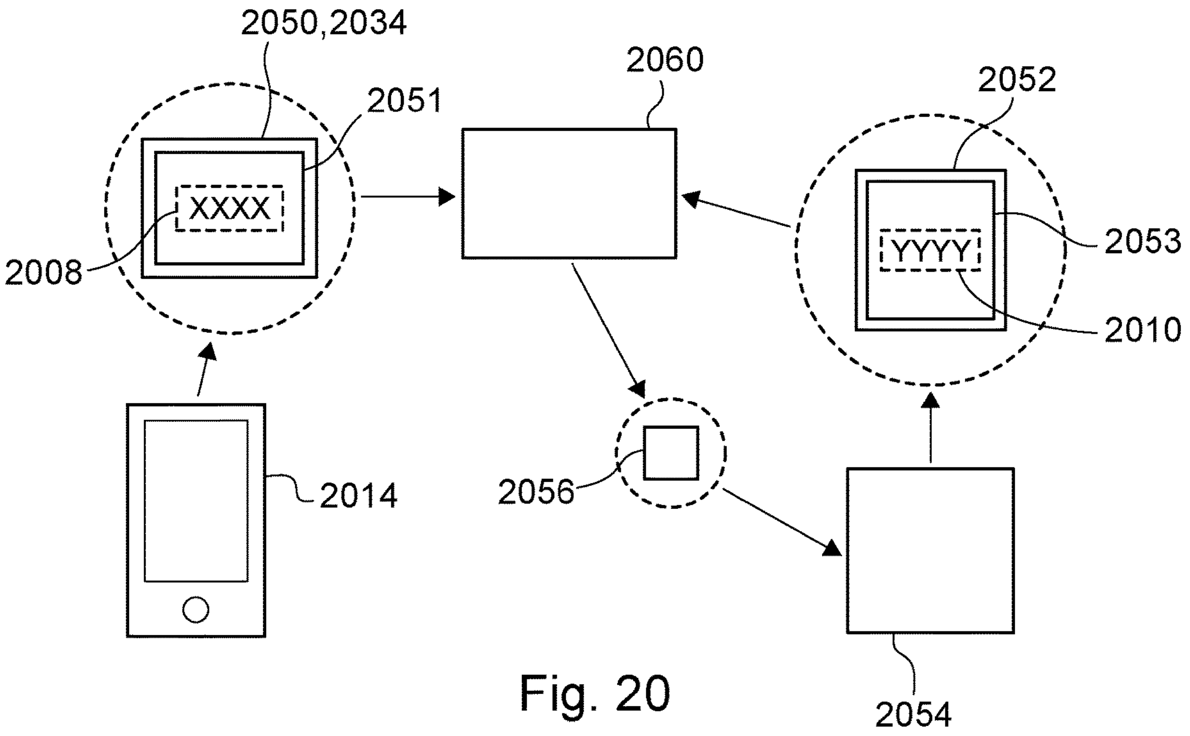
FIG. 20 illustrates schematically the method of FIG. 19.

A method for a computing device in accordance with the present disclosure will now be described with reference to FIGS. 19 and 20. For ease of comparison previous Figures, elements of FIG. 20 similar to corresponding elements of previous Figures are labelled with reference signs similar to those used in these Figures, but with prefix "20". Furthermore, for purposes of conciseness and clarity, only features and elements that differ substantially from corresponding features and elements described above will be discussed in detail in the following.

In a first step 1901, at least a first data packet 2050 is received from a user device 2014, the first data packet comprising first data 2051 associated with at least a first visual representation of a mail item. The first data packet may be received at the computing device 2060 in any suitable manner using any suitable transmission format.

The first data packet 2050 may comprise any suitable first data 2051. In some examples, the first data comprises the first visual representation. In some examples, the first data comprises a first postal identifier 2008 that has been determined based on the first visual representation. In some examples, the first data comprises additional data, e.g., (without limitations) additional identifying data elements; or additional data elements.

Figure 13:
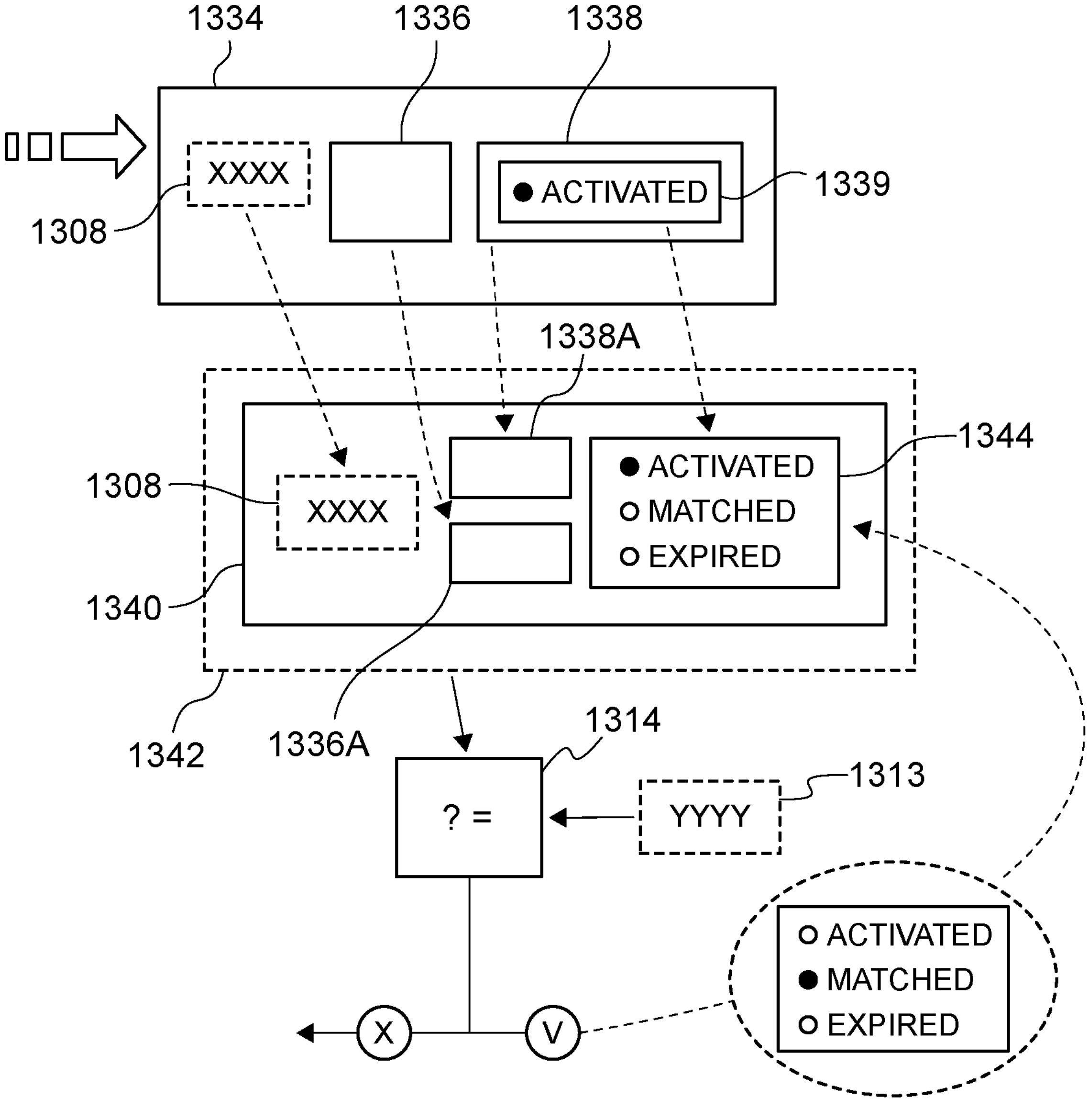
FIG. 13 illustrates schematically the exemplary step of FIG. 12.

In the present example, the first data packet 2050 is substantially identical to the first mail item record 2034 described with reference to FIG. 13 and FIG. 18.

In a second step 1902, at least a second data packet 2052 is received from a distribution centre device 2054, the second data packet comprising second data 2053 associated with at least a second visual representation of a mail item. The second data packet may comprise any suitable second data 2053. The second data packet may be received at the computing device 2060 in any suitable manner using any suitable transmission format.

In some examples, second data comprises the second visual representation. In some examples, the second data comprises a second postal identifier that has been determined based on the second visual representation. In some examples, the second data comprises additional data, e.g., (without limitations) additional identifying data elements; or additional data elements.

In the present example, the second data packet 2052 comprises at least the second postal identifier 2010.

In a third step 1903, the first data 2051 is compared with the second data 2053. It will be appreciated that the comparison step is dependent on the type, format, encoding or other properties of the first data and/or the second data.

Figure 12:
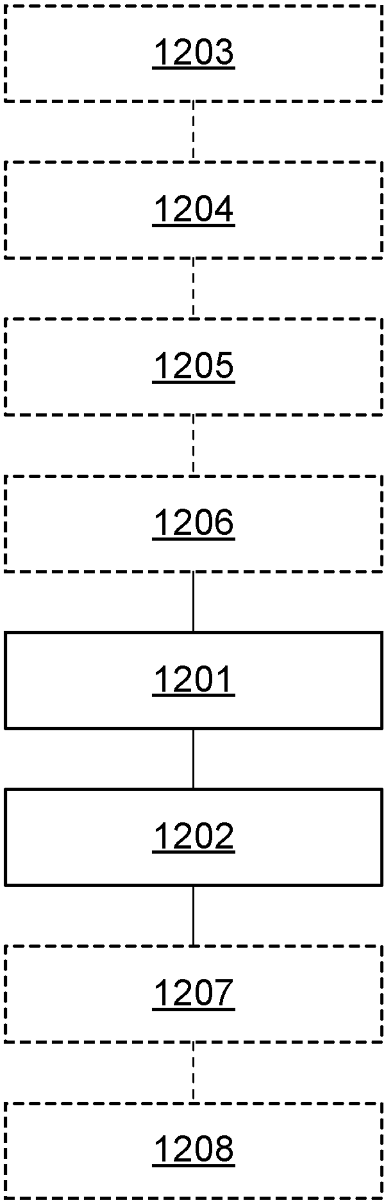
FIG. 12 shows an exemplary comparison step in accordance with an embodiment of the present invention.

In the present example, the comparison step is substantially identical to that described with reference to FIG. 12 and FIG. 13 above. It will nevertheless be appreciated that variations or modifications of this exemplary comparison step may be envisaged within the scope of the present disclosure.

In a fourth step, a comparison result 2056 is transmitted to the distribution centre device 2054. The comparison result may be transmitted in any suitable manner. Any suitable or relevant number of operations may be performed on the comparison result prior to transmission, including (without limitation): encryption; formatting; or encoding.

Figure 21:
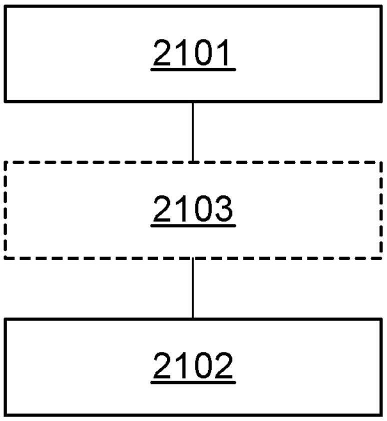
FIG. 21 illustrates a method for a distribution centre device in accordance with an embodiment of the present invention.
Figure 22:
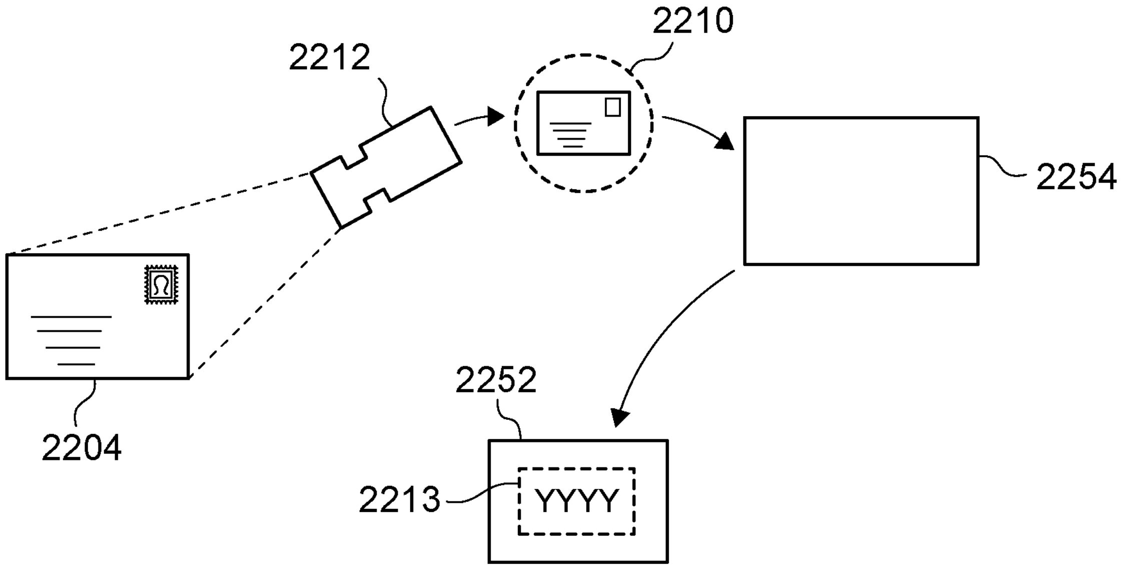
FIG. 22 shows schematically the method of FIG. 21.

A method for a distribution centre device in accordance with the present disclosure will now be described with reference to FIGS. 21 and 22. For ease of comparison previous Figures, elements of FIG. 22 similar to corresponding elements of previous Figures are labelled with reference signs similar to those used in these Figures, but with prefix "22". Furthermore, for purposes of conciseness and clarity, only features and elements that differ substantially from corresponding features and elements described above will be discussed in detail in the following.

In a first step 2101, a second visual representation 2210 of at least a portion of the mail item 2204 is obtained. The second visual representation may be obtained in any suitable fashion.

In an example, the step of obtaining the second visual representation 2210 comprises using a second imaging component or device 2212 to obtain an image of the portion of the mail item. The second imaging component may comprise any suitable or relevant features, components, elements or structures in order to obtain the image.

Any suitable imaging component may be used, including (without limitation): a camera component on a mobile phone; a camera component on a tablet; a camera component on a general computing device; a scanner; or a digital camera.

In the present example, the second visual representation is obtained by using a camera that forms part of or is connected to a distribution centre device 2254. In another example, the second imaging component 2212 is a camera component mounted in or affixed to a sorting or distribution unit (e.g., an automated sorting or distribution device). The sorting of distribution unit is located in a distribution centre wherein mail items are sorted and/or distributed.

The obtained image may have a suitable format and encoding. In some cases, the format and/or encoding of the obtained image is dependent on one or more of: the hardware of the device; the firmware or operating system installed on the device; any applications required to operate the imaging component.

In some examples, the second visual representation comprises additional data, the additional data comprising one or more of: a time stamp; location data; mail item data; user-related data; or user device data.

In a second step 2102, a second data packet 2252 is transmitted to a computing device, the second data packet comprising at least second data associated with the second visual representation. The second data packet may comprise any suitable or relevant second data associated with the second visual representation, including (but not limited to): the second visual representation; data derived from the second visual representation (e.g., a second postal identifier); or additional data elements associated with the second visual representation.

The exemplary method may, in some examples, comprise additional steps, some of which will be described for illustrative purposes below. It will be appreciated that these are purely for exemplary purposes, and that alternative steps may be envisaged within the scope of the present disclosure. Further, it will be appreciated, that, whilst disclosed as carried out on the user device, some of the below steps may, in principle, be performed on a different device (e.g., a remotely located computing device).

In the present example, the method comprises a third step 2103, in which a second postal identifier 2213 is determined based on the second visual representation 2210, and in which the first postal identifier is added to the second data packet 2252. The second postal identifier may be determined in any suitable manner and using a suitable methodology. In some examples, the second postal identifier is determined in a manner such as is described in one of the preceding examples.

In the present example, the second postal identifier is determined in substantially the same manner as the corresponding first postal identifier described in preceding examples.

In order to further illustrate the present invention, a number of exemplary implementations will now be presented, in which some or all of the preceding exemplary methods and method steps have been implemented. It should be noted that these are for illustrative and explanatory purposes only.

Figure 23:
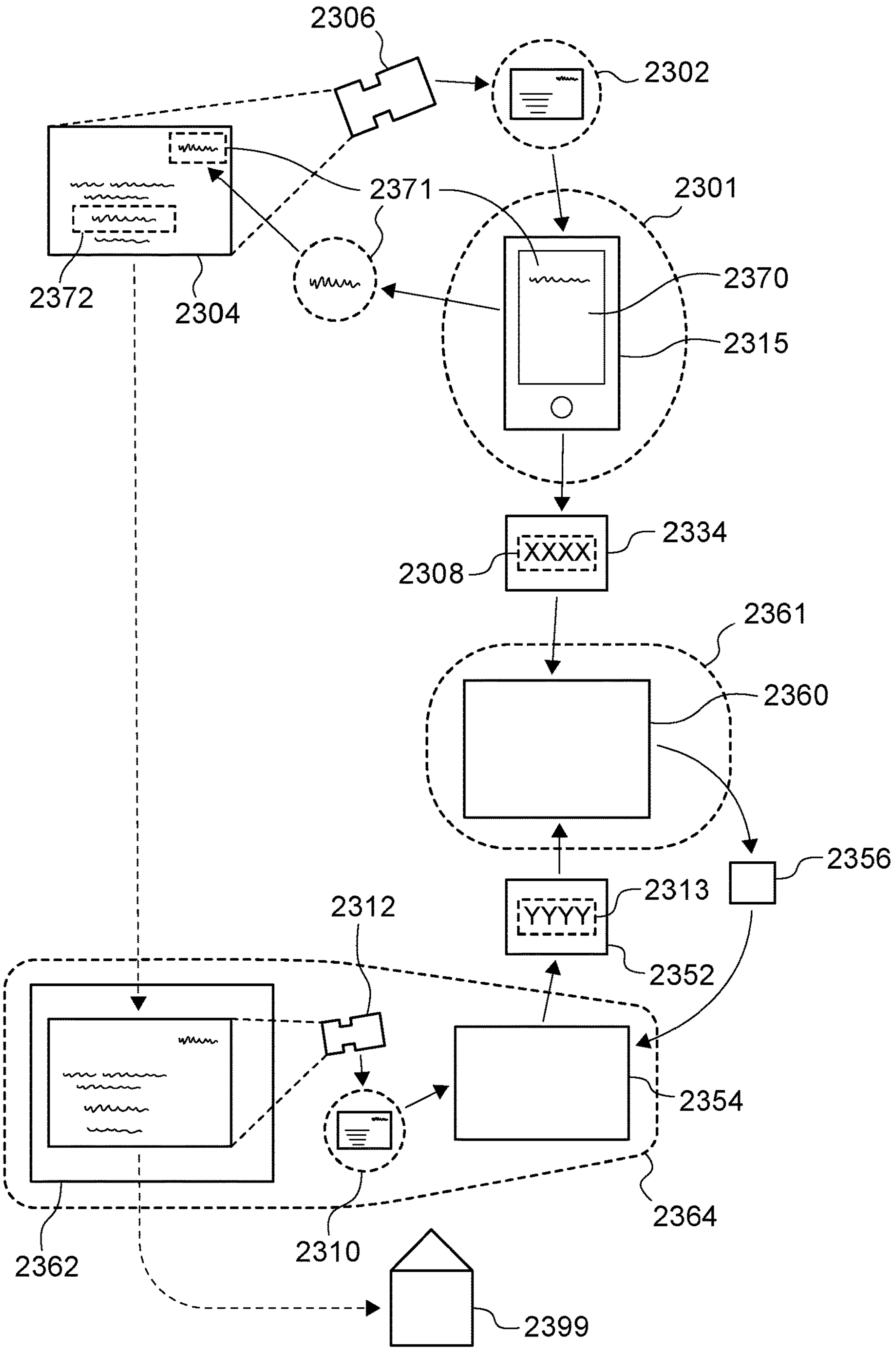
FIG. 23 shows a first exemplary implementation in accordance with an embodiment of the present invention.

A first exemplary implementation will now be described with reference to FIG. 23. For ease of comparison previous Figures, elements of FIG. 23 similar to corresponding elements of previous Figures are labelled with reference signs similar to those used in these Figures, but with prefix “23”. For purposes of conciseness and clarity, the features and elements of the first exemplary implementation will not be described in detail, but reference will be made to preceding examples where relevant.

In the first exemplary implementation, a user 2301 wishing to send a mail item 2304 to a recipient 2399 engages with a software application 2370 on a user device (e.g., a smart phone owned or operated by the user) 2315. The user inputs relevant data into the software application, which generates a first identifier. In turn, the user affixes the first identifier 2371 to the mail item.

The user then obtains an image or other first visual representation 2302 of the mail item 2304 by using a suitable imaging device 2306. Based on the first visual representation, a first postal identifier 2308 is determined. The first postal identifier is based on one or more of the first identifier 2371 or a second identifier 2372 that is associated with at least a portion of a recipient postal address (e.g., a postal code). The first postal identifier may be determined in a suitable fashion. For example, the first postal identifier may be determined as substantially described with reference to FIG. 6 and FIG. 7 above.

Once the first postal identifier has been extracted, it is activated and a first mail item record 2334 is generated, as is substantially described with reference to FIG. 9 and FIG. 10 above.

The first mail item record is transmitted to a computing device 2360 located remotely from the user device. The computing device may be operated by a suitable entity, such as an identity services provider 2361. The identity services provider maintains a record of activated mail items, which contains a record of mail items that have been validly activated and which can be assumed to have been mailed or otherwise been shipped in a suitable manner.

The mail item is eventually received in a distribution centre 2362 operated by a first carrier 2364. Once arrived at the distribution centre, a second visual representation 2310 of the mail item is obtained by way of an imaging device 2312 located in the distribution centre.

A distribution centre device 2354 (e.g., a server device operated by the first carrier 2364) is then used to determine a second postal identifier 2313. The second postal identifier is transmitted in a second packet 2352, along with any relevant additional data elements, to the computing device 2360.

The computing device 2360 then performs a comparison of the first postal identifier 2308 and the second postal identifier 2313 in order to verify the identity of the mail item 2304. Additionally, the computing device may carry out additional checks, including (without limitation): determining whether any fraudulent or illegal behaviour is being attempted; whether the type or classification of the mail item is correct; whether the weight and dimensions of the mail item correspond to the declared weight and dimensions; determining whether relevant fees have been paid in respect of the mail item; or whether the mail item contains illegal or controlled items or substances.

Based on the comparison step, the computing device 2360 may update the record of activated mail items appropriately. Further, the identity services provider transmits a comparison result 2356 to the first carrier 2364. Based on the comparison result, the first carrier can take any appropriate action with respect to the mail item 2304.

If the comparison step is successful, this typically results in the mail item 2304 being forwarded to the relevant recipient 2399. However, it will be appreciated that in some cases, other actions may be taken. Further, it will be appreciated that other actions may be taken subsequently, whether by the carrier, the user or the recipient.

Figure 24:
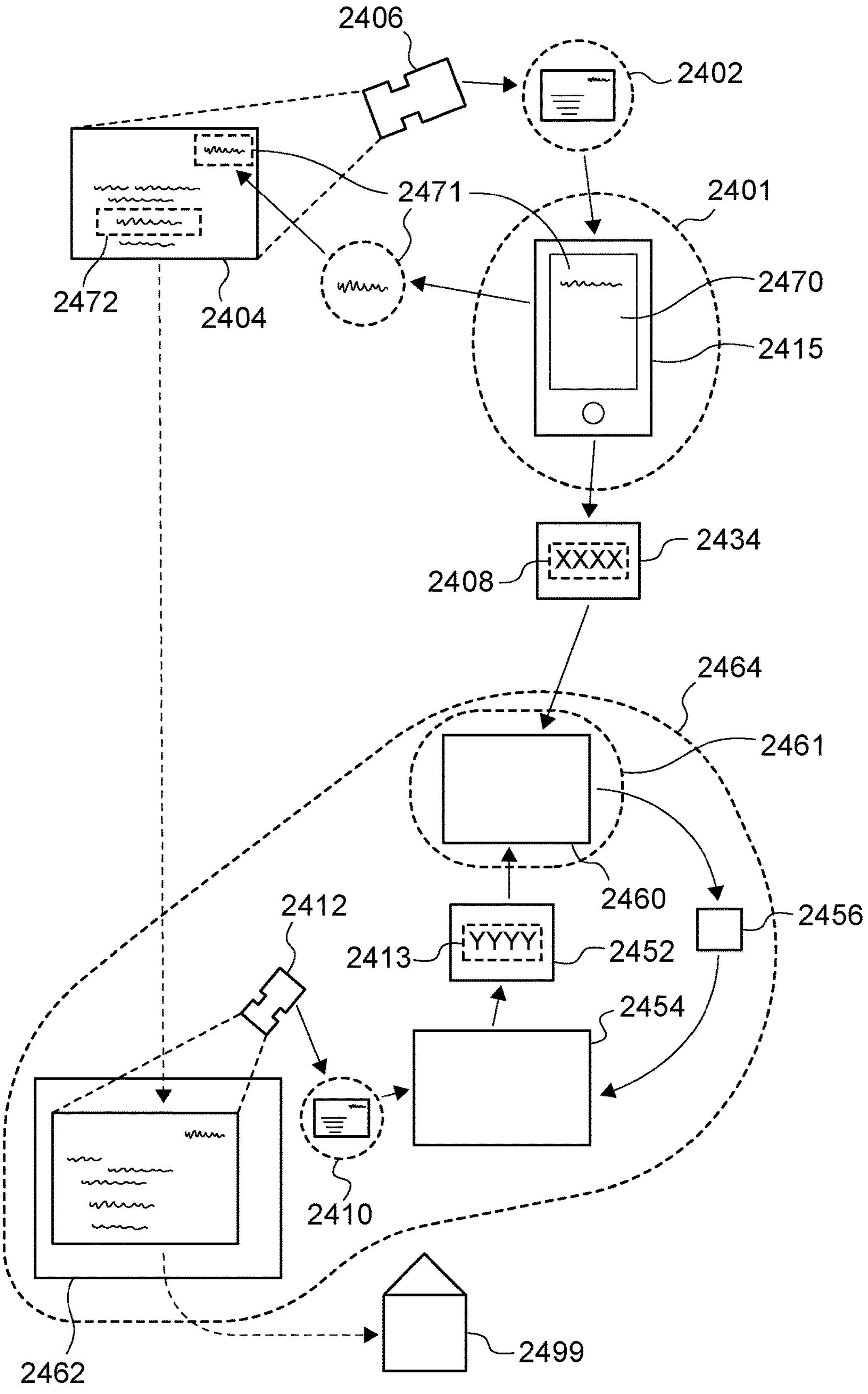
FIG. 24 illustrates a second exemplary implementation in accordance with an embodiment of the present invention.

A second exemplary implementation will now be described with reference to FIG. 24. For ease of comparison with preceding Figures, elements of FIG. 24 similar to corresponding elements of preceding Figures are labelled with reference signs similar to those used in these Figures, but with prefix “24”. For purposes of conciseness and clarity, features and elements of the second exemplary implementation will not be described in detail, but reference will be made to preceding examples where relevant.

In the second exemplary implementation, a user 2401 wishing to send a mail item 2404 to a recipient 2499 engages with a software application 2470 on a user device (e.g., a smart phone owned or operated by the user) 2415. The user inputs relevant data into the software application, which generates a first identifier. In turn, the user affixes the first identifier 2471 to the mail item.

The user then obtains an image or other first visual representation 2402 of the mail item 2404 by using a suitable imaging device 2406. Based on the first visual representation, a first postal identifier 2408 is determined. The first postal identifier is based on one or more of the first identifier 2471 or a second identifier 2472 that is associated with at least a portion of a recipient postal address (e.g., a postal code). The first postal identifier may be determined in a suitable fashion. For example, the first postal identifier may be determined as substantially described with reference to FIG. 6 and FIG. 7 above.

Once the first postal identifier has been extracted, it is activated and a first mail item record 2434 is generated, as is substantially described with reference to FIG. 9 and FIG. 10 above.

The first mail item record is transmitted to a computing device 2460 located remotely from the user device. In this implementation, the computing device is operated by a first carrier 2464. For example, the computing device may be placed within the computing infrastructure owned and operated by the first carrier. However, the first carrier does not have administrative control of the computing device. An identity services provider 2461 maintains administrative control of the computing device. For example, the identity services provider may be responsible for updates, maintenance, upgrades and so on, whilst the first carrier is effectively a user of the computing device.

A record of activated mail items is maintained on the computing device 2460, which contains a record of mail items that have been validly activated and which can be assumed to have been mailed or otherwise been shipped in a suitable manner.

The mail item 2404 is eventually received in a distribution centre 2462 operated by the first carrier 2464. Once arrived at the distribution centre, a second visual representation 2410 of the mail item is obtained by way of an imaging device 2412 located in the distribution centre.

A distribution centre device 2454 (e.g., a server device operated by the first carrier 2464) is then used to determine a second postal identifier 2413. The second postal identifier is transmitted in a second packet 2452, along with any relevant additional data elements, to the computing device 2460.

The computing device 2460 then performs a comparison of the first postal identifier 2408 and the second postal identifier 2413 in order to verify the identity of the mail item 2404. Additionally, the identity services provider may carry out additional checks, including (without limitation): determining whether any fraudulent or illegal behaviour is being attempted; whether the type or classification of the mail item is correct; whether the weight and dimensions of the mail item correspond to the declared weight and dimensions; determining whether relevant fees have been paid in respect of the mail item; or whether the mail item contains illegal or controlled items or substances.

Based on the comparison step, the computing device 2460 may update the record of activated mail items appropriately. Further, the computing device transmits a comparison result 2456 to the first carrier 2464. Based on the comparison result, the first carrier can take any appropriate action with respect to the mail item 2404.

If the comparison step is successful, this typically results in the mail item 2404 being forwarded to the relevant recipient 2499. However, it will be appreciated that in some cases, other actions may be taken. Further, it will be appreciated that other actions may be taken subsequently, whether by the carrier, the user or the recipient.

Figure 25:
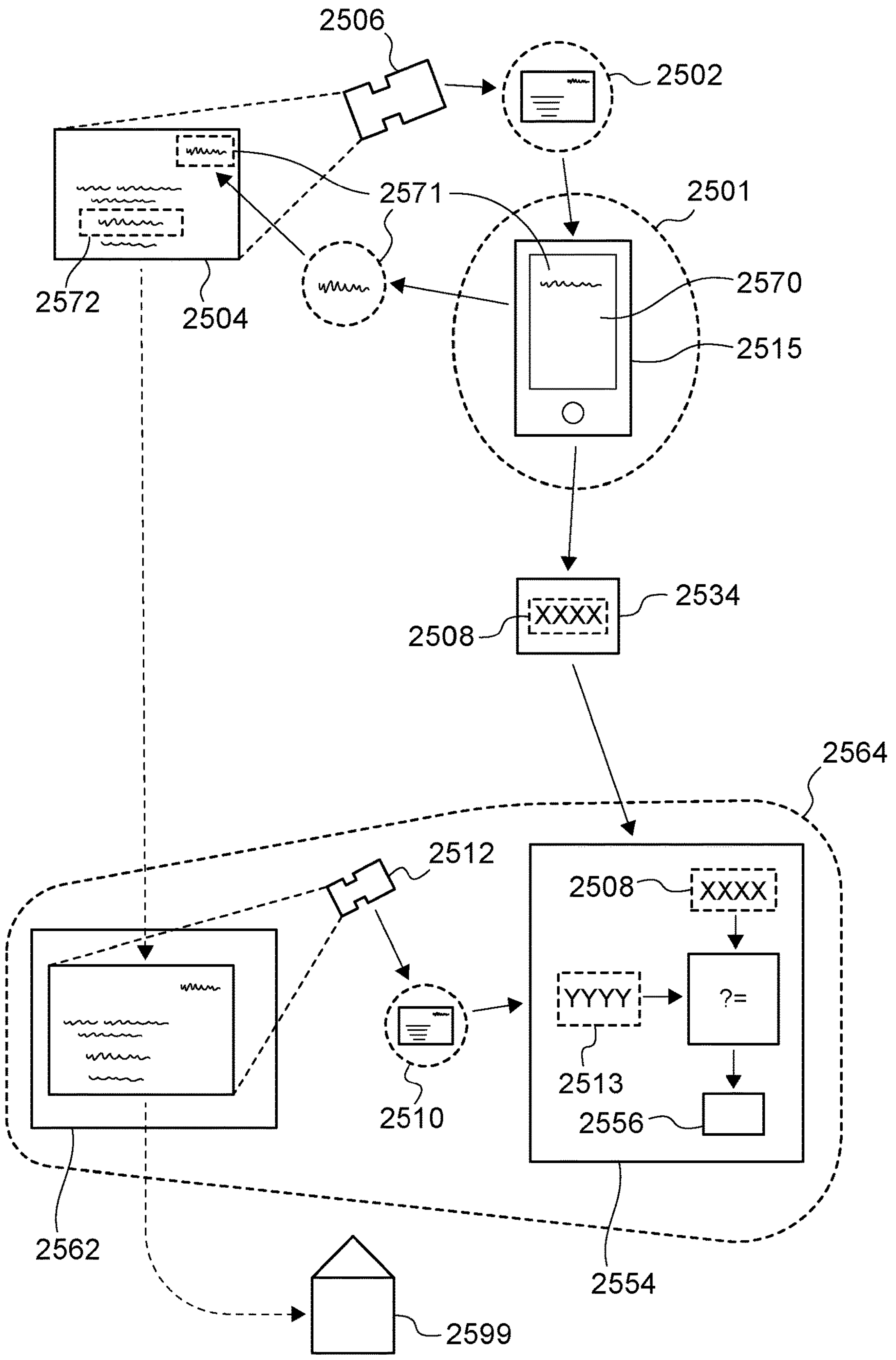
FIG. 25 shows a third exemplary implementation in accordance with an embodiment of the present invention.

A third exemplary implementation will now be described with reference to FIG. 25. For ease of comparison with preceding Figures, elements of FIG. 25 similar to corresponding elements of preceding Figures are labelled with reference signs similar to those used in these Figures, but with prefix "25". For purposes of conciseness and clarity, features and elements of the third exemplary implementation will not be described in detail, but reference will be made to preceding examples where relevant.

In the third exemplary implementation, a user 2501 wishing to send a mail item 2504 to a recipient 2599 engages with a software application 2570 on a user device (e.g., a smart phone owned or operated by the user) 2515. The user inputs relevant data into the software application, which generates a first identifier. In turn, the user affixes the first identifier 2571 to the mail item.

The user then obtains an image or other first visual representation 2502 of the mail item 2504 by using a suitable imaging device 2506. Based on the first visual representation, a first postal identifier 2508 is determined. The first postal identifier is based on one or more of the first identifier 2571 or a second identifier 2572 that is associated with at least a portion of a recipient postal address (e.g., a postal code). The first postal identifier may be determined in a suitable fashion. For example, the first postal identifier may be determined as substantially described with reference to FIG. 6 and FIG. 7 above.

Once the first postal identifier has been extracted, it is activated and a first mail item record 2534 is generated, as is substantially described with reference to FIG. 9 and FIG. 10 above.

The first mail item record is transmitted to a distribution centre device 2554 (e.g., a server device) located remotely from the user device. The distribution centre device is operated by a first carrier 2564.

A record of activated mail items is maintained on the distribution centre device 2554, which contains a record of mail items that have been validly activated and which can be assumed to have been mailed or otherwise been shipped in a suitable manner.

The mail item 2504 is eventually received in a distribution centre 2562 operated by the first carrier 2564. Once arrived at the distribution centre, a second visual representation 2510 of the mail item is obtained by way of an imaging device 2512 located in the distribution centre.

The distribution centre device 2554 is then used to determine a second postal identifier 2513. The second postal identifier is transmitted in a second packet, along with any relevant additional data elements, to the distribution centre device 2554.

The distribution centre device 2554 then performs a comparison of the first postal identifier 2508 and the second postal identifier 2513 in order to verify the identity of the mail item 2504. Additionally, the identity services provider may carry out additional checks, including (without limitation): determining whether any fraudulent or illegal behaviour is being attempted; whether the type or classification of the mail item is correct; whether the weight and dimensions of the mail item correspond to the declared weight and dimensions; determining whether relevant fees have been paid in respect of the mail item; or whether the mail item contains illegal or controlled items or substances.

Based on a comparison result 2556, the distribution centre device 2554 may update the record of activated mail items appropriately. Based on the comparison result, the first carrier can take any appropriate action with respect to the mail item 2504.

If the comparison step is successful, this typically results in the mail item 2504 being forwarded to the relevant recipient 2599. However, it will be appreciated that in some cases, other actions may be taken. Further, it will be appreciated that other actions may be taken subsequently, whether by the carrier, the user or the recipient.

Various embodiments are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory, computer-readable medium may include an electronic, magnetic, optical, electromagnetic, or semiconductor data storage system, apparatus or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM) or a portable digital versatile/video disc read-only memory (DVD/Blu-ray).

The computer program instructions may also be loaded onto a computer and/or other programmable data processing apparatus to cause a series of operational steps to be performed on the computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code etc.) that runs on a processor, which may collectively be referred to as "circuitry", "a module" or variants thereof. It should also be noted that in some alternate implementations, the functions/acts noted in the blocks may occur out of the order noted in the flowcharts. For examples, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein and without limitation to the scope of the claims. The applicant indicates that aspects of the invention may consist of any such individual feature or combination of features. In view of the foregoing description it will be evident to a person skilled in the art that various modifications may be made within the scope of the invention.

The invention claimed is:

1. A method of verifying the identity of a mail item, the method comprising:

obtaining using a first imaging component of a first device, a first visual representation of at least a portion of a mail item;

determining a first postal identifier based on the first visual representation by:

extracting at least one first identifier from the first visual representation, the first identifier comprising one of: a first generated sequence of characters, or one of a plurality of predetermined sequences of characters; wherein the extracting comprises performing one of: image recognition; pattern recognition; optical character recognition; or intelligent character recognition; and generating the first postal identifier based on the at least one first identifier;

activating the first postal identifier, the step of activating comprising associating the first postal identifier with one or more of: time stamp; validity period indicator; or status flag;

obtaining, using a second imaging component of a second device, a second visual representation of at least a portion of the mail item;

determining a second postal identifier based on the second visual representation in substantially the same manner as the corresponding first postal identifier; and a comparison step comprising comparing the second postal identifier with the first postal identifier, the comparison step further comprising an additional verification step, the verification step comprising:

identifying a first set of visual features of the first visual representation;

identifying a second set of visual features of the second visual representation;

comparing the first set of visual features to the second set of visual features; and enabling processing of the mail item based on the comparison step.

2. The method according to claim 1, wherein the first visual representation comprises additional data, the additional data comprising one or more of: a time stamp; location data; mail item data; user-related data; or user device data.

3. The method according to claim 1, wherein the step of activating comprises associating the first postal identifier with at least one of:

an additional identifying data element; and an additional data element.

4. The method according to claim 3, wherein the step of associating the first postal identifier comprises creating a first mail item record, and wherein the first mail item record comprises the first postal identifier and the at least one of the additional identifying data element or additional data element;

wherein the step of comparing comprises:

creating a first entry in the first mail item record of activated mail items based at least on the first postal identifier; and comparing the second postal identifier with the record of activated mail items.

5. The method according to claim 4, comprising:

transmitting the first mail item record to a remote device, and wherein the step of comparing comprises:

receiving the first mail item record; and extracting at least the first postal identifier from the first mail item record.

6. The method according to claim 4, wherein:

the step of comparing comprises modifying the first entry in the record of activated mail items if the second postal identifier is detected in the record of activated mail items; and the step of modifying comprises at least one of: removing the first entry from the record of activated mail items; adding a status flag to the first entry; or altering a status flag in the first entry.

7. The method according to claim 6, wherein the step of modifying the first entry comprises the step of modifying the first entry based on expiry of a validity period based on a time stamp associated with the mail item.

8. The method according to claim 4, wherein the step of comparing comprises:

extracting the at least one of the additional identifying data element or additional data element from the first mail item record; and adding the at least one of the additional identifying data element or additional data element to the first entry in the record of activated mail items.

9. The method according to claim 1, comprising:

comparing the second postal identifier with a list of processed identifiers; and preventing processing of the mail item if the second postal identifier is detected in the list of processed identifiers.

10. A method for a computing device, the method comprising:

receiving at least a first data packet from a user device, the first data packet comprising first data comprising at least one of: a first visual representation of a mail item obtained from a first imaging component of a first device, or a first postal identifier determined based on the first visual representation, wherein the first postal identifier is determined by:

extracting at least one first identifier from the first visual representation; the first identifier comprising one of: a first generated sequence of characters; or one of a plurality of predetermined sequences of characters, wherein the extracting comprises performing one of:

image recognition; pattern recognition; optical character recognition; or intelligent character recognition; and generating the first postal identifier based on the at least one first identifier;

activating the first postal identifier, the step of activating comprising associating the first postal identifier with one or more of a: time stamp; validity period indicator; or status flag;

receiving at least a second data packet from a distribution centre device, the second data packet comprising second data comprising at least one of: a second visual representation of the at least a portion of the mail item obtained from a second imaging component of a second device, or a second postal identifier determined based on the second visual representation wherein the second postal identifier is determined in substantially the same manner as the corresponding first postal identifier; and comparing the first data with the second data, the step of comparing comprising comparing the second postal identifier with the first postal identifier and further comprising an additional verification step, the verification step comprising:

identifying a first set of visual features of the first visual representation;

identifying a second set of visual features of the second visual representation;

comparing the first set of visual features to the second set of visual features; and transmitting a comparison result to the distribution centre device.

11. The method according to claim 10, wherein the step of activating comprises associating the first postal identifier with at least one of:

an additional identifying data element; and an additional data element.

12. The method according to claim 11, wherein the step of associating the first postal identifier comprises creating a first mail item record, and wherein the first mail item record comprises the first postal identifier and the at least one of the additional identifying data element or additional data element;

wherein the step of comparing comprises:

creating a first entry in the first mail item record of activated mail items based at least on the first postal identifier; and comparing the second postal identifier with the record of activated mail items.

13. The method according to claim 12, wherein the first data comprises the first mail item record, the first mail item record comprising at least the first postal identifier, and wherein the step of comparing comprises:

extracting at least the first postal identifier from the first mail item record, wherein the step of comparing comprises modifying the first entry in the record of activated mail items if the second postal identifier is detected in the record of activated mail items, wherein the step of modifying comprises at least one of: removing the first entry from the record of activated mail items; adding a status flag to the first entry; or altering a status flag in the first entry.

14. The method according to claim 12, wherein the step of comparing comprises:

extracting the at least one additional identifying data element from the first mail item record; and adding the at least one additional identifying data element to the first entry in the record of activated mail items.

15. A computer system comprising one or more processing devices, said one or more processing devices being connected by way of one or more connections, wherein the one or more processing devices are operable to perform the method of claim 1.

16. A computing device comprising at least a processing element and a communications element, the computing device being operable to connect to a network, wherein the computing device is operable to perform the method of claim 10.

17. A non-transitory computer-readable medium comprising machine-readable instructions which, when executed by a computer, cause the computer to carry out the method of claim 10.

* * * * *